US009559861B2

(12) United States Patent
Grasso et al.

(10) Patent No.: US 9,559,861 B2
(45) Date of Patent: Jan. 31, 2017

(54) METHOD AND SYSTEM FOR THE PROVISION OF COMMUNICATION SESSION CONTROL IN A LOCAL AREA NETWORK

(75) Inventors: Ennio Grasso, Turin (IT); Pino Castrogiovanni, Turin (IT)

(73) Assignee: Telecom Italia S.p.A., Milan (IT)

( * ) Notice: Subject to any disclaimer, the term of this patent is extended or adjusted under 35 U.S.C. 154(b) by 642 days.

(21) Appl. No.: 12/452,171

(22) PCT Filed: Jun. 29, 2007

(86) PCT No.: PCT/EP2007/005763
§ 371 (c)(1),
(2), (4) Date: Apr. 16, 2010

(87) PCT Pub. No.: WO2009/003496
PCT Pub. Date: Jan. 8, 2009

(65) Prior Publication Data
US 2010/0198954 A1 Aug. 5, 2010

(51) Int. Cl.
*G06F 15/173* (2006.01)
*H04L 12/28* (2006.01)
(Continued)

(52) U.S. Cl.
CPC ....... *H04L 12/2836* (2013.01); *H04L 12/2809* (2013.01); *H04L 67/14* (2013.01); *H04L 67/147* (2013.01); *H04L 12/2832* (2013.01)

(58) Field of Classification Search
USPC .................................. 709/223, 227
See application file for complete search history.

(56) References Cited

U.S. PATENT DOCUMENTS 7,796,603 B1 * 9/2010 Bertone et al. ............ 370/395.2
2006/0140199 A1   6/2006 Ma et al.
(Continued)

FOREIGN PATENT DOCUMENTS

WO   WO-2006/061682 A1   6/2006
WO   WO-2007/002604 A2   1/2007
WO   WO-2007/073403 A1   6/2007

OTHER PUBLICATIONS

Rosenberg et al.; "SIP: Session Initiation Protocol", Network Working Group, Request for Comments: 3261, Obsoletes: 2543, Category: Standards Track, pp. 1-269, (2002).
Cohen et al.; "General Event Notification Architecture Base," Internet Draft, <draft-cohen-gena-p-base-01.txt>, pp. 1-13, (1998).
Cohen et al.; "General Event Notification Architecture Base: Client to Arbiter", Internet Draft, <draft-cohen-gena-client-00.txt>, pp. 1-12, (1999).
(Continued)

*Primary Examiner* — Chris Parry
*Assistant Examiner* — Alan S Chou
(74) *Attorney, Agent, or Firm* — Finnegan, Henderson, Farabow, Garrett & Dunner, L.L.P.

(57) ABSTRACT

A method for enabling a local area network (LAN) appliance, supporting a synchronous-invocation/broadcast-notification protocol, to control communication sessions in a wide area network (WAN), the wide area network supporting a session-control protocol, includes: a) receiving from the LAN appliance a synchronous-invocation/broadcast-notification-protocol message invoking an operation for controlling a predetermined communication session in the wide area network, the execution of the operation involving an exchange of at least two session-control-protocol messages (Continued)

with at least one WAN apparatus supporting the session-control-protocol; b) processing the synchronous-invocation/broadcast-notification-protocol message received in a) to generate a first of the at least two session-control-protocol messages, which is adapted to start the execution of the operation; c) sending the message generated in b) toward said wide area network to start the execution of the operation; d) suspending a response for the LAN appliance to the invoked operation waiting for a condition indicating an outcome of the operation; e) when the condition is available, generating the response for the LAN appliance, the response being indicative of the outcome of the operation; and f) sending the response generated in e) to the LAN appliance.

14 Claims, 14 Drawing Sheets

(51) Int. Cl.
*H04L 29/08* (2006.01)
*G06F 15/16* (2006.01)

(56) References Cited

U.S. PATENT DOCUMENTS

| 2006/0153072 | A1 | 7/2006 | Bushmitch et al. |
| 2007/0143488 | A1* | 6/2007 | Pantalone ................. 709/230 |
| 2007/0143489 | A1 | 6/2007 | Pantalone |
| 2009/0083426 | A1* | 3/2009 | Cagenius ................. 709/227 |

OTHER PUBLICATIONS

Venezia et al., "Communication Web Services Composition and Integration", IEEE International Conference on Web Services, pp. 523-530, (2006).
Walker et al., "New Uses, Proposed Standards, and Emergent Device Classes for Digital Home Communications", Intel Technology Journal, vol. 10, No. 1, pp. 67-75, (2006).
International Search Report from the European Patent Office for International Application No. PCT/EP2007/005763 (May 15, 2008).

* cited by examiner

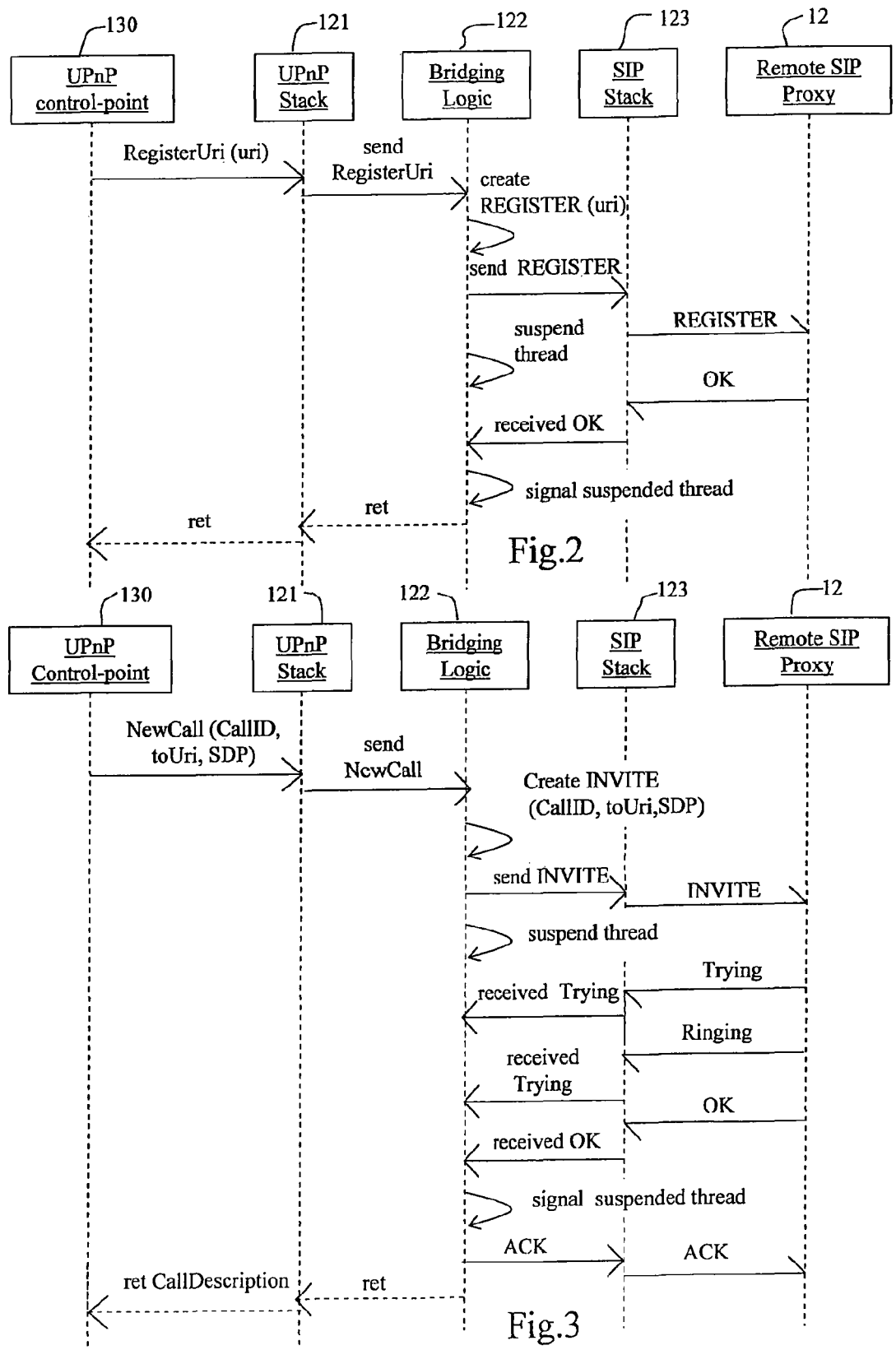

METHOD AND SYSTEM FOR THE PROVISION OF COMMUNICATION SESSION CONTROL IN A LOCAL AREA NETWORK

CROSS REFERENCE TO RELATED APPLICATION

This application is a national phase application based on PCT/EP2007/005763, filed Jun. 29, 2007, the content of which is incorporated herein by reference.

BACKGROUND OF THE INVENTION

Field of the Invention

The present invention relates to a method and system for the provision of communication session control in a local area network.

Description of the Related Art

The increasing deployment of broadband Internet access to the homes through network technologies such as the digital subscriber line (DSL) has created an opportunity to support new communication experiences by making the home an increasingly important networking center.

Digital content is becoming the predominant format for storing, viewing and managing media. Consumers want to enjoy content across different consumer electronic (CE) appliances and from many locations in their homes. Also personal communication is converging towards the digital streaming format, and the definition of a common set of technology standards to ensure interoperability between content and communication devices is a compelling requirement. For example, the Digital Living Network Alliance (DLNA) has issued a set of interoperability guidelines that define a framework of interoperable components for devices and services. The guidelines recommend the adoption of consolidated Internet standards, such as Internet Protocol (IP), Hyper Text Transfer Protocol (HTTP) and UPnP technology.

As well known in the art, according to proposed standard RFC3261 and extension thereof, Session Initiation Protocol (SIP) is an application-layer control and signalling protocol developed by the Internet Engineering Task Force ("IETF") for creating, modifying and terminating interactive communication sessions between one or more participants. These sessions may include Internet telephone calls, multimedia distribution, and multimedia sessions such as voice and/or video conference, supporting user mobility, negotiation of multimedia end-point capabilities through the integration with a Session Description Protocol (SDP), call routing and session transfer functionalities.

SIP was accepted by the Third Generation Partnership Project (3GPP) as signaling protocol of the IP Multimedia Subsystem (IMS) architecture. Indeed, it is widely assumed that SIP-based communications will gradually replace traditional Public Switched Telephone Network (PSTN), due to lower management costs and higher flexibility in the combination of different media, such as audio, video, and text.

On the other hand, Universal Plug and Play (UPnP) technology establishes protocols that allow consumer electronic (CE) appliances in a local area network to interact with each other.

UPnP architecture establishes a set of standardized protocols that consumer electronic (CE) appliances implement to provide discovery, control and data transfer between such appliances. Examples of appliances that may be configured to implement UPnP protocols include computers, servers, printers, telephones, digital cameras, video recorders, Internet personal appliances, or personal digital assistants. UPnP architecture distinguishes between UPnP devices which expose services and UPnP control points which discover and use such services.

Accordingly, the UPnP architecture provides for a typical client/server model that distinguishes between service providers (devices) and service consumers (control-points). For example, a UPnP TV device may provide a service for viewing digital media, whilst the TV's remote control may act as control-point of the TV.

UPnP employs a protocol named Simple Service Discovery Protocol (SSDP) to discover available devices on the local network and a protocol named Simple Object Access Protocol (SOAP) as mechanism to invoke service operations provided by devices. SSDP uses a multicast variant of HTTP (HTTPMU) that exploits the IP multicast service available on the local area network. HTTPMU is used by UPnP devices to send advertisement messages and by control points to send search requests for finding available UPnP services.

Besides, UPnP also defines a mechanism to manage event notifications related to changes in the state of a UPnP device, based on the General Event Notification Architecture (GENA) as defined by the IETF in two Internet drafts ("General Event Notification Architecture Base", J. Cohen, S. Aggarwal, 9 Jul. 1998, <draft-cohen-gena-p-base-01.txt>; and "General Event Notification Architecture Base: Client to Arbiter", J. Cohen, S. Aggarwal, Y. Y. Goland, 6 Sep. 2000, <draft-cohen-gena-p-base-01.txt>). This mechanism is based on a subscription that a control-point can make to receive notifications about changes in state variables associated with a UPnP device.

Due to the nature of UPnP service discovery and eventing mechanism, UPnP technology is limited to network devices that are connected in a network environment where multicasting is supported.

Hitherto, the main effort of the UPnP standardization process for multimedia devices has been focused on content-based services. The UPnP AV Architecture document and the MediaServer and MediaRenderer standard device specifications are the result of this activity. This standard explicitly states that enabling two-way interactive communication services (such as audio and video conferencing) is outside the goal of the UPnP AV Architecture, albeit some proposals in that direction have recently been submitted.

US-2006/0140199-A1 and US-2006/0153072-A1 disclose an architecture and mechanism for bridging the UPnP and SIP protocols. The documents describe a proxy apparatus for translating UPnP messages into SIP messages. The proxy parses the structured XML content of a UPnP SOAP invocation and embeds said XML in the header part, body part, or both of the corresponding SIP message. Although such approach is very general, the syntactic translation of messages enables the mere transportation of UPnP messages using SIP requests/responses as carrier protocol, whereby a SIP device (e.g. a mobile phone) can be employed for controlling UPnP devices/services. The Applicant notes that these documents teach to use the SIP protocol as a means to access UPnP services and devices from outside the home network environment exploiting location and routing services offered by SIP-enabled networks, but does not specifically address the issue of controlling a conference session trough the UPnP protocol. Moreover, the disclosed approach accounts for syntactic translations between UPnP and SIP protocols, and is independent of the semantic characteristic of the services. The invention disclosed in the two aforementioned documents does not cover the topic of interoperability between UPnP homed devices and session control services offered by a SIP-based network, where the syntactic issue is simply one aspect in the broader interoperability problem that requires the specification of a new UPnP device/service for the translation of SIP session control messages in UPnP methods/events and vice versa.

Mark Walker et al., "New Uses, Proposed Standards, and Emergent Device Classes for Digital Home Communications", published on the Intel Technology Journal on Feb. 15, 2006, propose a digital home communications network for facilitating the integration, of in-home personal communication devices and extending personalized communication services to devices outside the home. In particular, they define two device classes: a Home Communications Server (HCS)—offering simple call management functions and a set of extended functionalities related to communication services, such as contact list, personalized call routing, and mailbox message management—and a Digital Communication Adaptor (DCA) that relies on the HCS and adapts legacy consumer electronics equipments such as the TV-set for use as a communication device.

The Applicant observes that the Authors of this article highlight an interest in extending UPnP-based services towards communication services, although their proposal is merely an architectural description.

The same observation applies to the architecture proposed by WO 2007/002604 and WO 2006/061682 for extending UPnP-based services towards mobile-specific services as, for example, VoIP, messaging (e.g., SMS, MMS), presence, multimedia services using SIP and SDP, conferencing applications, etc.

SUMMARY OF THE INVENTION

The Applicant faced the problem of enabling a local area network (LAN) appliance, supporting a synchronous-invocation/broadcast-notification protocol, to control communication sessions in a wide area network (WAN), supporting a session-control protocol, in a simple and effective way.

In particular, the Applicant faced the problem of accomplishing this object when the synchronous-invocation/broadcast-notification protocol is a synchronous client/server protocol supporting a broadcast discovery and eventing mechanism (as, for example, UPnP) and the session-control protocol is an asynchronous peer-to-peer messaging protocol (as, for example, SIP).

As already stated in the foregoing, besides SOAP for synchronous operations, UPnP employs a broadcast event notification mechanism based on the GENA protocol that allows control-points to be notified when state variables in a device change their value. The subscribe/notify mechanism for state variables in GENA is completely different from the peer-to-peer messaging model provided by SIP. In the GENA model, all subscribed control-points are notified for the status change of any state variable. Moreover, subscriptions are always anonymous, thereby not allowing a UPnP device to notify a single control-point. Accordingly, an approach that simply translates the SIP peer-to-peer messaging model into UPnP GENA events will result in a contrived architecture.

The Applicant acknowledged the characteristics of the UPnP GENA event model and accommodated its peculiarities in the definition of the invention hence disclosed.

In a first aspect, the present invention relates to a method for enabling a local area network (LAN) appliance, supporting a synchronous-invocation/broadcast-notification protocol, to control communication sessions in a wide area network (WAN), said wide area network supporting a session-control protocol, the method comprising:

a) receiving from the LAN appliance a synchronous-invocation/broadcast-notification-protocol message invoking an operation for controlling a predetermined communication session in the wide area network, the execution of said operation involving an exchange of at least two session-control-protocol messages with at least one WAN apparatus supporting said session-control-protocol;

b) processing the synchronous-invocation/broadcast-notification-protocol message received in a) to generate a first of said at least two session-control-protocol messages, which is adapted to start the execution of said operation;

c) sending the message generated in b) towards said wide area network to start the execution of said operation;

d) suspending a response for the LAN appliance to the invoked operation waiting for a condition indicating an outcome of said operation;

e) when said condition is available, generating said response for the LAN appliance, the response being indicative of the outcome of the operation; and f) sending the response generated in e) to the LAN appliance.

In the present description and claims, the expression:
"session control" is used to indicate session set up or management, including, for example, renegotiating, forwarding and transferring;
"synchronous-invocation/broadcast-notification protocol" is used to indicate a protocol adapted to perform a synchronous invocation of operations and a broadcast notification of events such as, for example, UPnP;
"session-control protocol" is used to indicate a protocol adapted to perform session set up or management, including for example renegotiating, forwarding and transferring, such as, for example, SIP;
"broadcasting" comprises multicasting; and
"session" is used to indicate an exchange of data between two or more entities.

According to the method of the invention, a response for the LAN appliance to the invocation for a predetermined operation is suspended till a condition indicating the outcome of the operation is available.

The implementation of the invoked operation is therefore completely transparent to the invoking LAN appliance and perceived by the LAN appliance as an atomic synchronous operation that simply returns an outcome (success or failure) of the operation when the exchange of session-control-protocol messages required to implement the requested operation terminates.

This allows to overcome in an effective and simple way the technical difficulties arising when bridging two protocols (synchronous-invocation/broadcast-notification protocol and session-control protocol) based on two different communication models as, for example, UPnP and SIP respectively.

In particular, the present invention provides for the definition of a set of high-level operations relating to communication session setup and management. Each high-level operation corresponds to a well-defined semantic functionality as perceived relevant in the definition of the operation. Each operation is implemented through a series of (SIP) transactions and low-level messages. According to the invention, the underlying implementation and therefore the complex transactions that takes place during the implementation of a high level operation is concealed from the LAN appliance invoking such operation. The LAN appliance is provided with the outcome (success or failure) of the whole operation only when all the underlying (SIP) transactions are terminated and, in case of failure, of the reason for the failure.

According to an embodiment of the invention, said synchronous-invocation/broadcast-notification protocol is UPnP, including extension thereof.

According to an embodiment of the invention, said session-control protocol is SIP, including extension thereof.

According to an embodiment of the invention, the WAN apparatus may be a WAN user device connected to the wide area network.

Typically, the WAN apparatus is a WAN server. For example, in a SIP implementation, the WAN server can be a SIP proxy and/or registrar and/or redirect server. The WAN server is advantageously adapted to act as intermediary for at least one WAN user device connected to the wide area network.

For example, in a SIP implementation, the user device can be a SIP user agent or a PSTN or GSM phone interworking with a SIP network by means of a suitable gateway apparatus.

The user device may be a computer, a mobile phone, a personal digital assistant (PDA), or similar device.

The LAN appliance may be a consumer electronic appliance as for example a TV-set, a digital camera, a videophone, a computer, a PDA or similar device.

Typically, the local area network covers a local area like a home, an office, or similar environments.

For example, the local area network is a UPnP local network.

The wide area network can, for example, be a SIP network as, for example, a IMS (IP multimedia subsystem) type telecommunication network.

According to an embodiment, the message in c) is sent to said at least one WAN apparatus through a WAN server.

According to an embodiment, the response in d) is suspended till said exchange of at least two session-control-protocol messages is terminated. The condition in d) can be related to a session-control-protocol message sent to or received from the wide area network, said message being indicative of the outcome of the operation. For example, in a SIP implementation, said session-control-protocol message can be a SIP 200 OK message, a SIP ACK message, a SIP 603 DECLINE message, a 486 Busy Here Message or a 408 request timeout message.

When the condition is related to a session-control-protocol message received from the wide area network, e) and f) are performed when said message is received from the wide area network or when said message is not received within a predetermined period of time.

When the outcome of the operation is positive, the response generated in e) advantageously comprises information required to correctly control the predetermined communication session.

For example, the predetermined operation invoked in a) can be an operation for registering a LAN appliance identity before the WAN apparatus; for setting up a new communication session between the LAN appliance and a WAN user device; for setting up a new communication session between two WAN user devices; for accepting to set up a communication session with a WAN user device; for transferring an ongoing communication session between the LAN appliance and a WAN user device from the LAN appliance towards another WAN user device; for transferring an ongoing communication session between a first WAN user device and a second WAN user device from the first WAN user device towards the LAN appliance; for forwarding an incoming call to the LAN appliance towards a WAN user device; or for renegotiating the media capabilities involved in a pending communication session.

In a SIP implementation, the message generated in b) can be, for example, a SIP REGISTER message, a SIP INVITE message or a SIP 200 OK message.

According to a preferred embodiment, the method further comprises receiving from the LAN appliance a request to set up a subscription to receive notifications on changes in predetermined state variables.

In this embodiment, at the occurrence of a change in any of said predetermined state variables, the method advantageously further comprises broadcasting a notification of said change to the subscribed LAN appliance(s).

For example, said state variables may be adapted to notify an incoming call, a cancellation of an incoming call and/or a termination of an active call.

According to an embodiment, the method further comprises receiving from the LAN appliance a synchronous-invocation/broadcast-notification-protocol message requesting information about current incoming calls. In this embodiment, the method advantageously further comprises sending to the LAN appliance a response comprising information about current incoming calls.

According to an embodiment, the method further comprises receiving from the LAN appliance a synchronous-invocation/broadcast-notification-protocol message requesting information about current active calls. In this embodiment, the method advantageously further comprises sending to the LAN appliance a response, comprising information about current active calls.

In a second aspect, the present invention relates to an interfacing device for enabling a local area network (LAN) appliance supporting a synchronous-invocation/broadcast-notification protocol to control communication sessions in a wide area network (WAN), the wide area network supporting a session-control protocol, the interfacing device comprising modules adapted to:

a) receive from the LAN appliance a synchronous-invocation/broadcast-notification-protocol message invoking an operation for controlling a predetermined communication session in the wide area network, the execution of said operation involving an exchange of at least two session-control-protocol messages with at least one WAN apparatus supporting said session-control-protocol;

b) process the synchronous-invocation/broadcast-notification-protocol message received in a) to generate a first of said at least two session-control-protocol messages, which is adapted to start the execution of said operation;

c) send the session-control-protocol message generated in b) towards the wide area network to start the execution of said operation;

d) suspend a response for the LAN appliance to the invoked operation waiting for a condition indicating an outcome of the operation;

e) when said condition is available, generate said response for the LAN appliance, the response being indicative of the outcome of the operation;

f) send the response generated in e) to the LAN appliance.

For example, when the synchronous-invocation/broadcast-notification protocol is UPnP, the interfacing device comprises a UPnP stack adapted to perform a) and f).

For example, when the session-control protocol is SIP, the interfacing device comprises a SIP stack adapted to perform c).

Typically, the interfacing device comprises a processing unit adapted to perform at least b), d) and e).

In a third aspect, the present invention relates to a communication system comprising:
- a local area network (LAN) comprising at least one LAN appliance, supporting a synchronous-invocation/broadcast-notification protocol, and an interfacing device; and
- a wide area network (WAN) comprising a plurality of WAN apparatuses supporting a session-control-protocol;

wherein the interfacing device comprises modules adapted to:

a) receive from the LAN appliance a synchronous-invocation/broadcast-notification-protocol message invoking an operation for controlling a predetermined communication session in the wide area network, the execution of said operation involving an exchange of at least two session-control-protocol messages with at least one of said plurality of WAN apparatuses;

b) process the synchronous-invocation/broadcast-notification-protocol message received in a) to generate a first of said at least two session-control-protocol messages, which is adapted to start the execution of said operation;

c) send the session-control-protocol message generated in b) towards one of said plurality of WAN apparatuses;

d) suspend a response for the LAN appliance to the invoked operation waiting for a condition indicating an outcome of said operation;

e) when said condition is available, generate said response for the LAN appliance, the response being indicative of the outcome of the operation;

f) send the response generated in e) to the LAN appliance.

As far as concerns further additional features of the second and third aspect of the invention, reference is made to what already disclosed above with reference to the first aspect of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein:

FIG. 2 schematically shows an example of the principal messages exchanged when a consumer electronic appliance (UPnP control-point) requests to register a new SIP identity;

FIG. 3 schematically shows a first example of the principal messages exchanged when a consumer electronic appliance (UPnP control-point) requests to set up a new call;

DETAILED DESCRIPTION OF THE INVENTION

Figure 1:
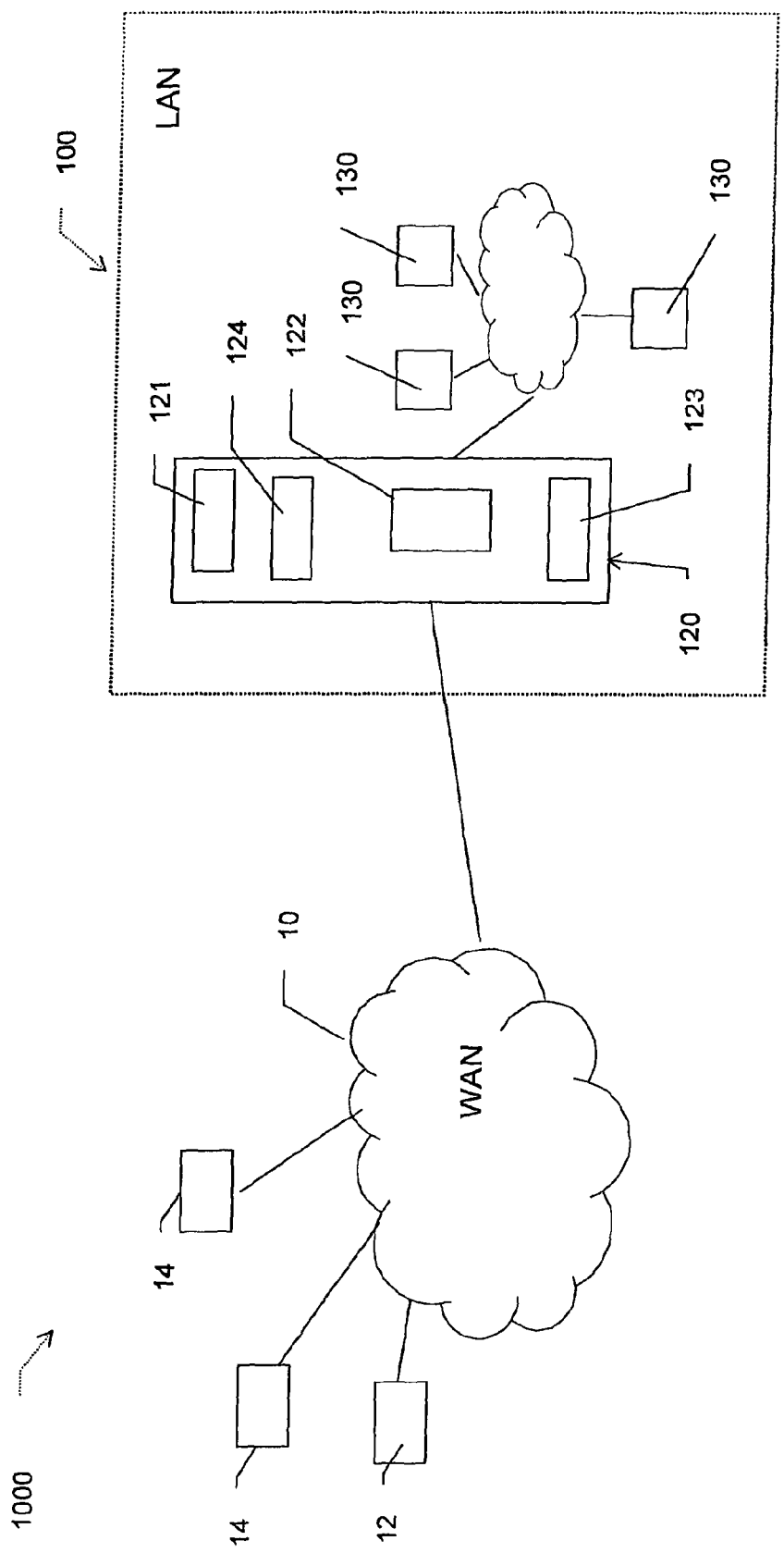
FIG. 1 schematically shows an embodiment of a communication system according to the invention.

FIG. 1 shows a communication system 1000 according to an embodiment of the invention comprising a local area network (LAN) 100, a wide area network (WAN) 10, a WAN server 12 associated with the wide area network 10 and two WAN devices 14. In its turn, the local area network 100 comprises a plurality of local area network appliances 130 and an interfacing device 120, connected together through wireless link, wired link or a combination thereof, according to techniques known in the art.

The local area network 100 is connected to the wide area network 10 through the interfacing device 120. The WAN devices 14 are in communication with the LAN 100 through the wide area network 10 and the WAN server 12.

The local area network may be any type of local network.

The local area network 100 may cover a local area like a home, an office, or similar environments.

For example, the local area network can be within a home, appliances 130 can be consumer electronic appliances (e.g., a TV-set, a digital camera, a video-phone, a computer, a personal digital assistant (PDA) and so on) and the WAN devices 14 can be a computer, a phone, a personal digital assistant and so on.

For simplicity and not by way of limitation, in the remainder of the description reference is made to an exemplary embodiment of the invention wherein WAN devices 14 themselves, or through a suitable interface, are adapted to act as SIP user agents to execute communications sessions using SIP and extensions thereof. Messages between WAN devices 14, WAN server 12 and interfacing device 120 are exchanged through SIP and extensions thereof.

In the exemplary embodiment, WAN server 12 is acting as a SIP proxy/registrar/redirect server within the wide area network 10.

The LAN 100 is typically identified in the communication system 1000 by one or more identifiers associated with the interfacing device 120 and the WAN devices 14 are typically identified by a device identifier. For example, in case of SIP, the identifiers are SIP-URI (or TEL-URI) identifiers.

The interfacing device 120 as well as WAN devices 14 are adapted to register themselves with the WAN server 12 through a SIP REGISTER message.

In this way, the interfacing device 120 is identified as a SIP user agent in the wide area network 10 and can be invited to participate in communication sessions by WAN devices 14 acting as SIP User agents in the wide area network 10.

For simplicity and not by way of limitation, in the remainder of the description reference is further made to an exemplary embodiment of the invention wherein consumer electronic appliances 130 themselves, or by means of a suitable interface, are UPnP control points.

For example, the UPnP control points may be:
- multimedia devices that can manage multimedia streams associated with an audio/video conference session (i.e. audio/video streams acquisition/encoding and decoding/rendering), as for example, a TV-set or a PC equipped with microphone, speakers, and video camera; or
- simple device that do not support multimedia streams management capabilities as, for example, a PDA or a mobile phone, or a simple PC. This type of 'simpler' devices can exploit the multimedia capabilities of other multimedia devices.

The interfacing device 120 comprises hardware modules, software modules and/or combinations thereof, adapted to implement the invention, according to the various aspects thereof.

In an exemplary embodiment, the interfacing device 120 comprises a UPnP stack 121, a SIP stack 123, a bridging logic 122 and a processing unit 124 adapted to execute the bridging logic 122. The UPnP stack 121 and the SIP stack 123, as known in the art, provide access to UPnP and SIP protocols, respectively, whilst the bridging logic 122 is adapted to implement the invention, according to the various aspects thereof.

The interfacing device 120 is adapted to support a series of operations for communication sessions setup or management. Exemplary operations are: register/unregister a SIP identity (URI) with the WAN server 12; get a list of current active calls; get a list of current incoming (ringing) calls; accept/reject an incoming call; forward an incoming call to a given SIP identity; set up a new call with a given SIP identity; setup a third party call between two SIP identities; terminate an active (ongoing) call; renegotiate the media capabilities of an active call; transfer a third party call to a local multimedia device; transfer an active call to a third party SIP identity.

Moreover, the interfacing device 120 is adapted to support event state variables to signal a new incoming call; a cancelled incoming call; and a terminated active call.

The principal messages exchanged between a LAN appliance 130, the interfacing device 120 and the WAN server 12 to implement the above mentioned exemplary operations are detailed below with reference to FIGS. 2 to 22.

In FIGS. 2 to 22, normal narrows are used to indicate UPnP (synchronous) messages, broken line narrows are used to indicate return messages of (synchronous) UPnP operations, half point arrows are used to indicate SIP (asynchronous) messages.

Moreover, even when communication sessions involve WAN devices 14, only the intermediation of WAN server 12 is depicted in FIGS. 2 to 21.

FIG. 2 shows an example of the principal messages exchanged when a consumer electronic appliance (UPnP control-point) 130 (such as, for example, a TV-set) sends a UPnP message to the interfacing device 120 requesting to register a new SIP identity at the WAN server (remote SIP proxy) 12. For example, according to the embodiment shown, the appliance 130 makes the request by invoking a RegisterUri operation supported by the interfacing device 120. Upon receiving the request, the UPnP stack 121 dispatches it to the bridging logic 122. The bridging logic 122 first creates a SIP REGISTER message, whose headers 'from' and 'to' correspond to the SIP URI provided in the argument of the UPnP RegisterUri message. Other standard headers are filled accordingly. For instance, the 'contact' header will contain the SIP contact information of the interfacing device 120. Once created, the SIP REGISTER message is delivered to the WAN server 12 through the SIP stack 123.

As mentioned in the foregoing, one technical challenge in bridging the UPnP and SIP protocols relates to their different communication models. UPnP operations are synchronous and atomic, whilst SIP messages are asynchronous with every high-level transaction comprising a series of (at least two) peer-to-peer messages, which sometimes may also involve explicit user interaction, such as the response to an incoming call.

According to the invention, after sending the SIP REGISTER message to the WAN server 12, the current thread of execution in charge of the invoked operation in interfacing device 120 waits for the corresponding SIP response before completing the operation and returning the result to the invoking control-point 130. This mechanism is realized in the interfacing device 120 through the use of a condition variable associated with the created SIP REGISTER message. Upon sending the SIP message, the current thread (e.g., T1) suspends on the corresponding condition variable. Once the SIP response message is received (in the example, a SIP 200 OK message), the SIP stack 123 dispatches the response to a thread (e.g., T2) taken from a pool of serving-threads. Said serving-thread T2 stores the final response of the SIP transaction on a predetermined storage area, then retrieves and signals the condition variable associated with the response, thereby resuming the suspended thread T1.

At this point, the resumed thread T1 completes the RegisterUri operation by retrieving the final response of the SIP transaction on said predetermined storage area and by either returning normally or raising an exception depending on whether the SIP transaction completed successfully or the response is in fact a failure code.

Therefore, according to the invention the result of the invoked operation is returned to the invoking control-point 130 only when the final response for the SIP transaction is received.

FIG. 3 shows an example of the principal messages exchanged when a consumer electronic appliance (UPnP control-point) 130 sends a UPnP message to the interfacing device 120 requesting to set up a new call with a WAN device (not shown). For example, according to the embodiment shown, the appliance 130 makes the request by invoking a NewCall operation supported by the interfacing device 120. The NewCall message carries a call identifier (CallID), the Uri of the called WAN device (toUri) and the Session Description protocol (SDP) (shown in FIG. 3 in parentheses) describing the media capabilities of the calling UPnP control point 130. Upon receiving the request, the UPnP stack 121 dispatches it to the bridging logic 122. The bridging logic 122 creates a SIP INVITE message, whose header 'to' corresponds to the SIP URI provided in the argument of the UPnP NewCall message. Other standard headers will be filled according to techniques known in the art. The body of the SIP INVITE message will contain the SDP provided in the argument of the UPnP NewCall message.

Once created, the SIP INVITE message is delivered to the WAN server (remote SIP proxy) 12 through the SIP stack 123. Then, the current thread of execution in interfacing device 120 suspends on a condition variable, waiting to be resumed upon receipt of the final response of the SIP INVITE transaction.

In the embodiment shown in FIG. 3, the WAN server 12 sends a SIP trying message, a SIP ringing message and a SIP OK message. Upon receiving said SIP messages, the SIP stack 123 dispatches them to the bridging logic 122. When the SIP OK message is received, the suspended thread resumes its processing in the same manner as described above with reference to FIG. 2 for the REGISTER message.

First, the resumed thread sends a SIP ACK message to the remote SIP proxy 12 to complete the SIP session setup, and returns to UPnP control-point 130 an XML call descriptor for the newly created communication session, comprising information required to correctly control the SIP session. In case of failure of the SIP session setup (case not shown), it will return an exception corresponding to the SIP failure code.

According to a variant not shown, the thread of execution (e.g., T1), suspended after sending the SIP INVITE message, may be resumed after sending the SIP ACK message. In this case, said ACK message is sent by a serving thread (e.g., T2) selected from a pool of available serving-threads.

An exemplary XML schema of the call descriptor comprising information required to correctly control the SIP session is provided herein.

```
<?xml version="1.0"?>
<CallDescriptorSet
xmlns:xsi="http://www.w3.org/2001/XMLSchema-instance"
xmlns:xsd="http://www.w3.org/2001/XMLSchema">
    <CallDescriptor>
        <CallID>1092198044-2074980337-1382253773</CallID>
        <Status>Active</Status>
        <From>sip:3435@163.162.43.12</From>
        <To>sip:3041@163.162.96.30:5060</To>
        <RequestSdp>v=0
            o=videofone 16264 18299 IN IP4 163.162.97.30
            s=SIP htTUP(nP)
            c=IN IP4 163.162.97.30
            b=CT:1000
            t=0 0
            m=audio 5002 RTP/AVP 4 18
            a=sendrecv
            a=rtpmap:4 G723/8000
            a=rtpmap:18 G729/8000
            m=video 5006 RTP/AVP 96 34
            a=sendrecv
            a=rtpmap:96 H264/90000
            a=fmtp:96 packetization-mode=1
            a=rtpmap:34 H263/90000
        </RequestSdp>
        <ResponseSdp>v=0
            o=SIPUA 111 22 IN IP4 163.162.43.12
            s=SIP THU
            c=IN IP4 163.162.43.12
            t=0 0
            m=audio 12334 RTP/AVP 4
            a=sendrecv
            a=rtpmap:4 G723/8000
            m=video 12336 RTP/AVP 96
            a=sendrecv
            a=rtpmap:96 H264/90000
        </ResponseSdp>
    </CallDescriptor>
</CallDescriptorSet>
```

The UPnP control-point 130 will inspect the returned XML call descriptor to determine the media capabilities negotiated by the invited WAN device to allocate the appropriate audio/video resources.

In the embodiment shown in FIG. 3, the CallID provided in the NewCall message gives the UPnP control-point 130 the possibility to subsequently invoke a CancelCall operation, described in more detail below, by using the same CallID to interrupt the activated call.

Figure 4:
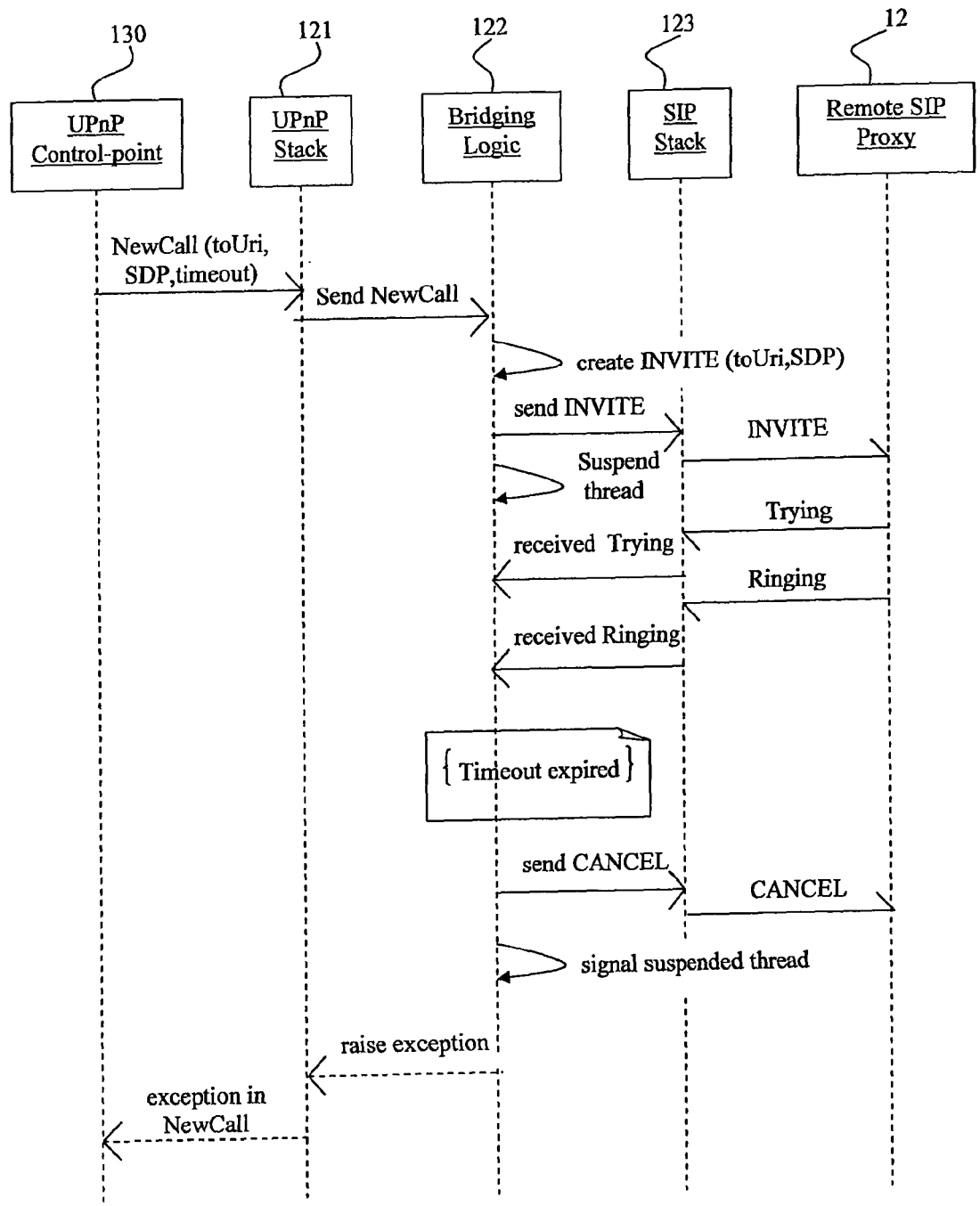
FIG. 4 schematically shows a second example of the principal messages exchanged when a consumer electronic appliance (UPnP control-point) requests to set up a new call.

According to another embodiment, shown in FIG. 4, the invoking UPnP control-point 130 does not provide a CallID in the NewCall message. In this case, the call identifier is advantageously generated by the interfacing device 120 and eventually returned to the UPnP control-point 130 within the above mentioned XML call descriptor, when the operation succeeds. In this embodiment the NewCall message has a timeout argument to let the invoking UPnP control-point 130 specify the maximum time for the operation to complete. If the timeout expires before the SIP transaction completes, the call will be automatically cancelled by the interfacing device 120 by sending a SIP CANCEL message to the invited WAN device.

Figure 5:
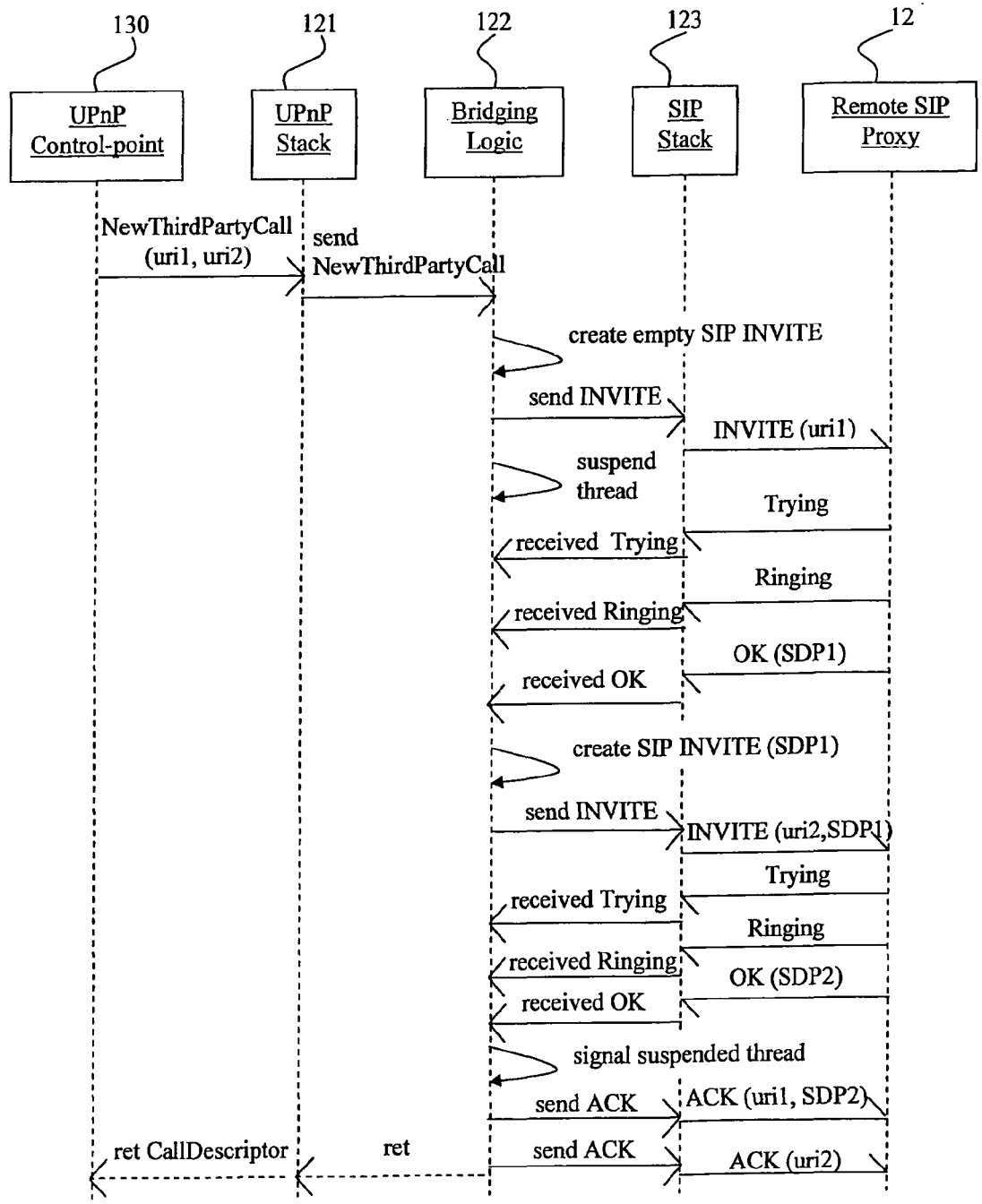
FIG. 5 shows an example of the principal messages exchanged when a consumer electronic appliance (UPnP control-point) requests to set up a new call between two WAN SIP devices.

FIG. 5 shows an example of the principal messages exchanged when a consumer electronic appliance (UPnP control-point) 130 sends a UPnP message to the interfacing device 120 requesting to set up a new call between two WAN devices (not shown in FIG. 5) with the intermediation of the WAN server 12. For example, according to the embodiment shown, the appliance 130 makes the request by invoking a NewThirdPartyCall operation supported by the interfacing device 120. This operation implements a SIP third-party-call session setup, first INVITE(ing) the first WAN device with an empty SDP, thereby making an 'offer' in SIP parlance, then using the returned SDP to INVITE the second WAN device, and finally ACK(nowledging) the first WAN device with the SDP negotiated with the second WAN device.

In particular, in FIG. 5, the NewThirdPartyCall message sent by the UPnP control-point 130 comprises arguments (shown in parentheses) comprising the URIs of the two WAN devices involved in the operation. Upon receiving the request, interfacing device 120 creates a SIP INVITE message, whose header 'to' corresponds to the first (URI1) of the SIP URIs provided in the arguments of the UPnP NewThirdPartyCall message and whose body contains an empty SDP thereby making an 'offer' in the SIP parlance.

Once created, the SIP INVITE message is delivered to the WAN server 12 (remote SIP proxy) through the SIP stack 123. Then the current thread of execution (e.g., T1) in interfacing device 120 suspends on a condition variable, waiting to be resumed upon receiving the final response of the first SIP transaction required to invite the first party. In the embodiment shown in FIG. 5, the WAN server 12 sends in sequence a SIP trying message, a SIP ringing message and a SIP OK message, the body of the SIP OK message containing the SDP1 describing the media capabilities of the first invited WAN device identified by URI1. Upon receiving said SIP messages, the SIP stack 123 dispatches them to some serving-thread from a pool of available serving-threads. Upon receiving the SIP OK message from the first invited WAN device, the selected serving-thread (e.g., T2) retrieves and signals the condition variable associated with the response, thereby resuming the suspended thread (T1) in charge of executing the NewThirdPartyCall operation.

At this point, the resumed thread (T1) creates a SIP INVITE message for the second invited WAN device, whose header 'to' corresponds to the second (URI2) of the two SIP URIs provided in the arguments of the UPnP NewThirdPartyCall message. Moreover, the body of the SIP INVITE message contains the SDP1 received in the previous step.

Once created, the SIP INVITE message is delivered to the WAN server (remote SIP proxy) 12 through the SIP stack 123. Then the current thread of execution (T1) suspends on the same condition variable as before, waiting to be resumed upon receiving a final response for the second SIP transaction required to invite the second party.

Then, WAN server 12 sends in sequence a SIP trying message, a SIP ringing message and a SIP OK message, the body of the SIP OK message containing the SDP2 negotiated with the second invited WAN device. Upon receiving the SIP OK message, the suspended thread (T1) is resumed in the same manner as described above.

At this point, the resumed thread sends a SIP ACK message to the first invited WAN device, including the negotiated SDP2, and a SIP ACK message to the second invited WAN device to terminate the two SIP transactions.

Moreover, the resumed thread (T1) returns to UPnP control-point 130 an XML call descriptor for the newly created communication session.

Therefore, the result of the invoked operation is returned to the invoking control-point 130 only after the final responses for all the underlying SIP transactions are received.

According to a variant not shown, the thread of execution (e.g., T1), suspended after sending the first SIP INVITE message, may be resumed after sending the SIP ACK message to the second invited WAN device. In this case, the second SIP INVITE message and the two ACK messages of FIG. 5 are sent by a serving thread (e.g., T2) selected from a pool of available serving-threads.

The complexity of SIP transactions and dialogs, involving a plurality of peer-to-peer messages between the interfacing device 120 and the two WAN devices, is completely transparent to the invoking UPnP control-point 130, which perceives the NewThirdPartyCall operation as a single atomic synchronous operation which returns a single call descriptor for the third-party-call as a whole. In fact, the interfacing device 120 internally maintains an association between the CallIDs of the two SIP communication sessions with the two invited WAN devices and the CallID, that identifies the third-party-call as a whole. The UPnP control point 130 will identify the third-party-call with said 'whole' CallID, masking the fact that the interfacing device 120 internally maintains two separated, yet related, SIP communication sessions.

It is noted that for simplicity, only the first thread suspension and the last thread resumption have been depicted in FIG. 5 and in the following figures, even when more than one thread suspension-resumption mechanism is provided for executing the invoked operation.

Figure 6:
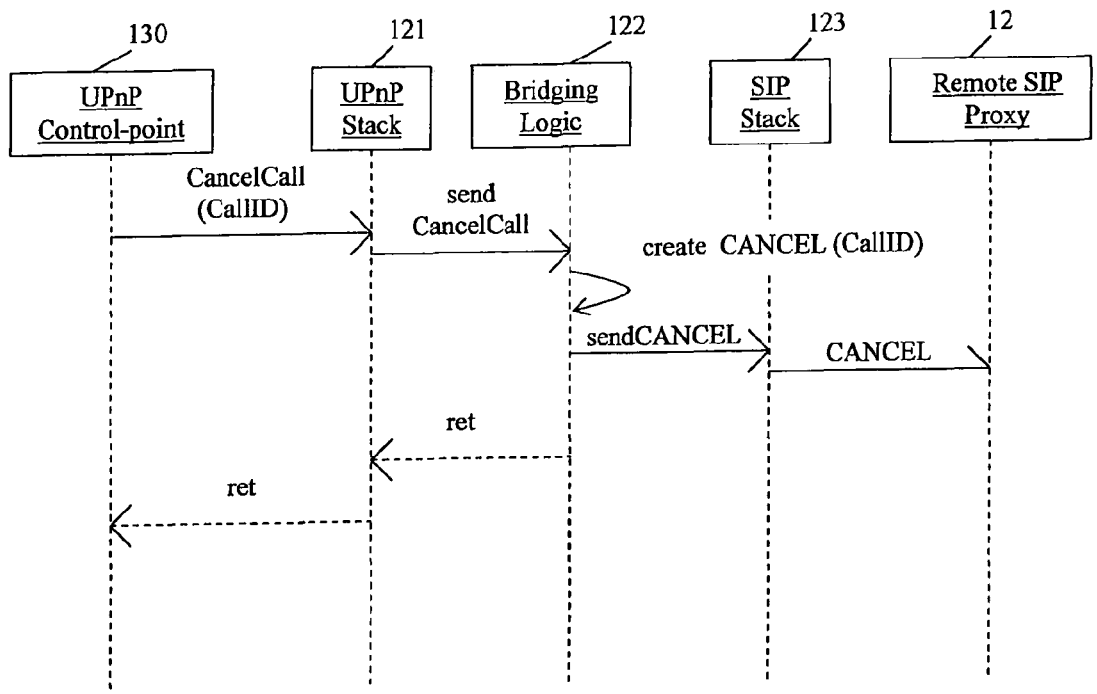
FIG. 6 shows a first example of the principal messages exchanged when a consumer electronic appliance (UPnP control-point) requests to abort the setting up of a call.
Figure 7:
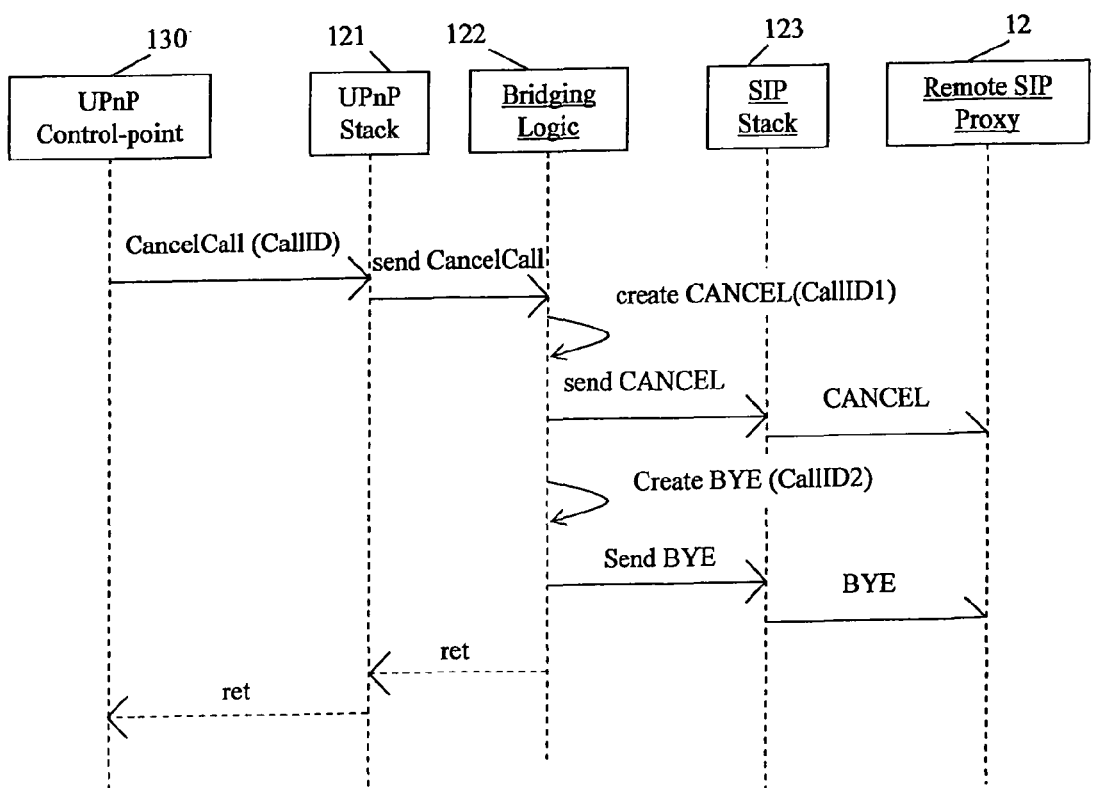
FIG. 7 shows a second example of the principal messages exchanged when a consumer electronic appliance (UPnP control-point) requests to abort the setting up of a call.

As shown in FIGS. 6 and 7, at any point after invoking NewCall or NewThirdPartyCall operations, and before such operations completes, the UPnP control-point 130 can invoke an operation (e.g., CancelCall operation) supported by the interfacing device 120 to abort the ongoing call setup by passing the CallID that identifies such call in the CancelCall message argument. When the operation to be aborted is a NewCall operation, the interfacing device 120 sends a SIP CANCEL message for the invited WAN device, thereby aborting the pending SIP call setup transaction (FIG. 6). When the operation to be aborted is a NewThirdPartyCall operation, the interfacing device 120 takes a different course of action depending on the state of the pending SIP transaction. In particular, if the pending SIP transaction still involves the first invited WAN device, then a SIP CANCEL message to said party will suffice to abort the transaction (FIG. 6). If, on the other hand, the SIP transaction with the first invited WAN device has successfully completed and the pending SIP transaction involves the second invited WAN device, then the interfacing device 120 sends a SIP CANCEL message for the second invited WAN device and a SIP BYE message for the first invited WAN device (FIG. 7).

Figure 8:
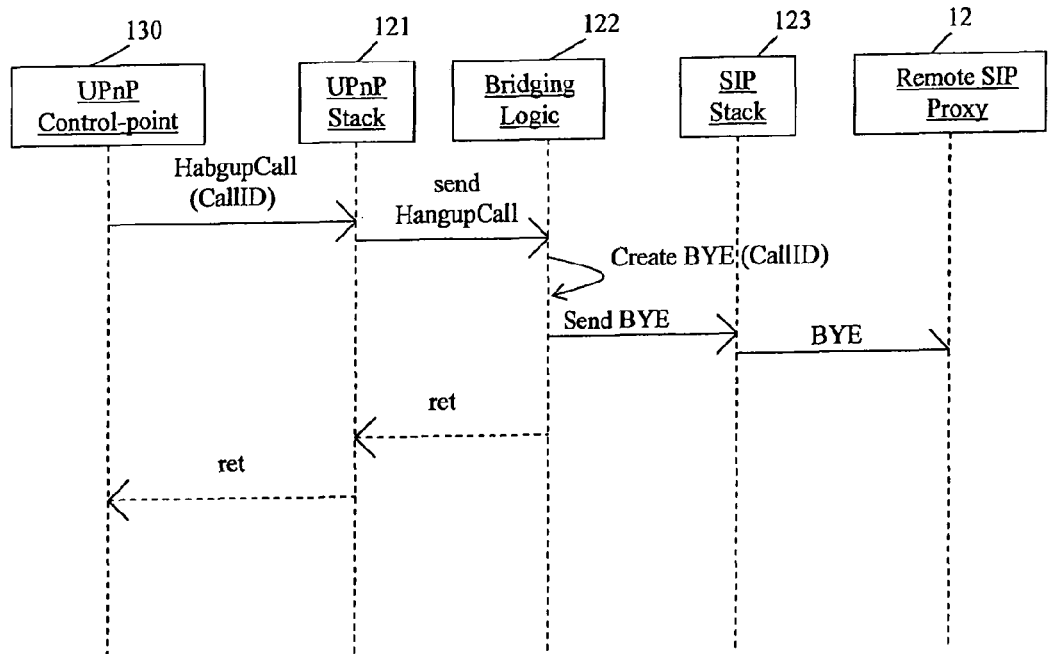
FIG. 8 shows a first example of the principal messages exchanged when a consumer electronic appliance (UPnP control-point) requests to terminate a previously set up call.
Figure 9:
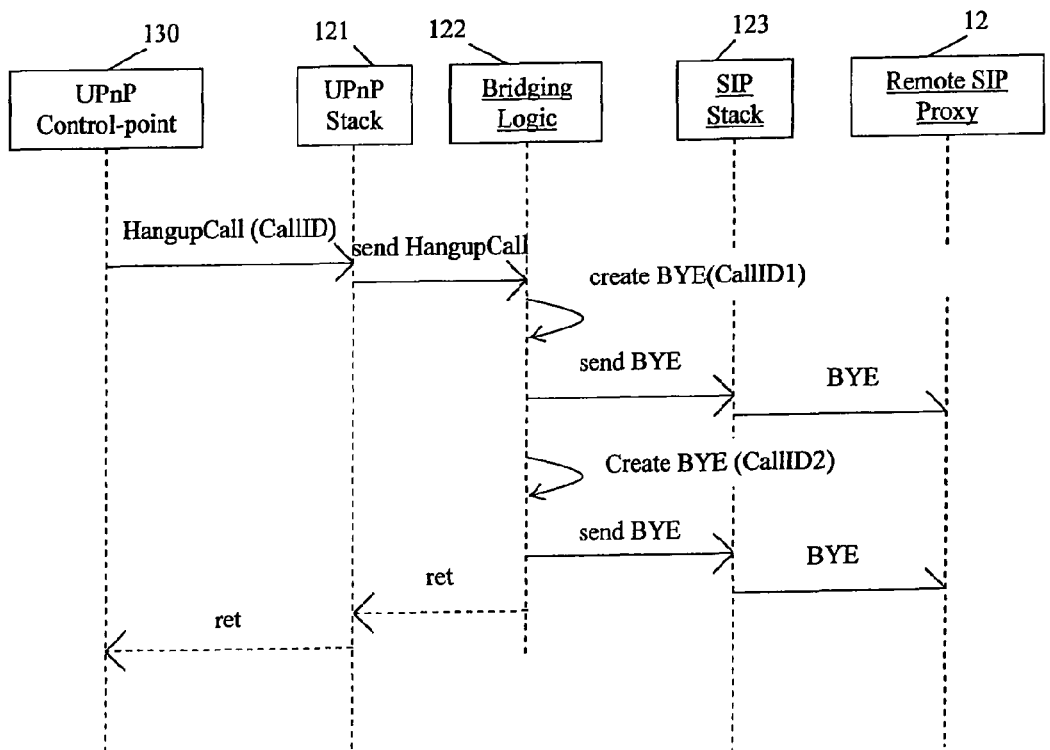
FIG. 9 shows a second example of the principal messages exchanged when a consumer electronic appliance (UPnP control-point) requests to terminate a previously set up call.

As shown in FIGS. 8 and 9, at any point during an active call the UPnP control-point 130 can invoke an operation (e.g. HangupCall operation) supported by the interfacing device 120 to terminate the call by passing the CallID that identifies such call in the argument of the HangupCall message. If the call is a simple call (e.g. established with a NewCall operation), the interfacing device 120 sends a SIP BYE message for the WAN device through the intermediation of WAN server 12 (FIG. 8). If the call is a third-party-call (e.g. established with a NewThirdPartyyCall operation), the interfacing device 120 sends a SIP BYE message to both WAN devices, through the intermediation of WAN server 12 (FIG. 9).

Figure 10:
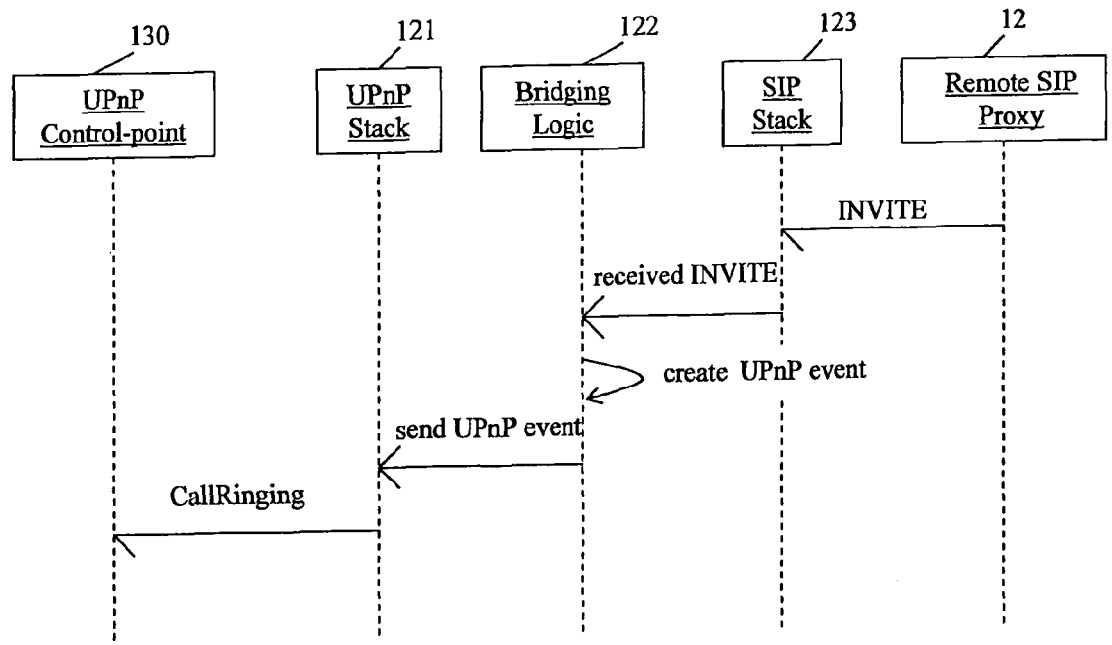
FIG. 10 shows an example of the principal messages exchanged when a consumer electronic appliance (UPnP control-point) is notified of an incoming call.

FIG. 10 shows an example of the principal messages exchanged when an appliance (UPnP control-point) 130 is notified of the presence of a new incoming call.

As shown in FIG. 10, in this situation SIP stack 123 receives a SIP INVITE message from server (remote SIP proxy) 12 to set up a call between a WAN device (not shown) and UPnP control-point 130. The SIP stack 123 dispatches the SIP INVITE message to the bridging logic 122 which sets a CallRinging state variable with the call identifier (CallID) of the incoming call.

In FIG. 10, it is assumed that the UPnP control-point 130, after discovering the interfacing device 120 through the UPnP protocol (namely, the Simple Service Discovery Protocol or SSDP), has subscribed to receive notification events on changes in the state variables of the interfacing device 120.

In the case shown, the state variable CallRinging is set to the CallID of the incoming SIP INVITE message. Changes in the state variable causes the UPnP stack 121 to broadcast the CallRinging event message to all UPnP control points in the local network 100 that have subscribed with the interfacing device 120.

Figure 11:
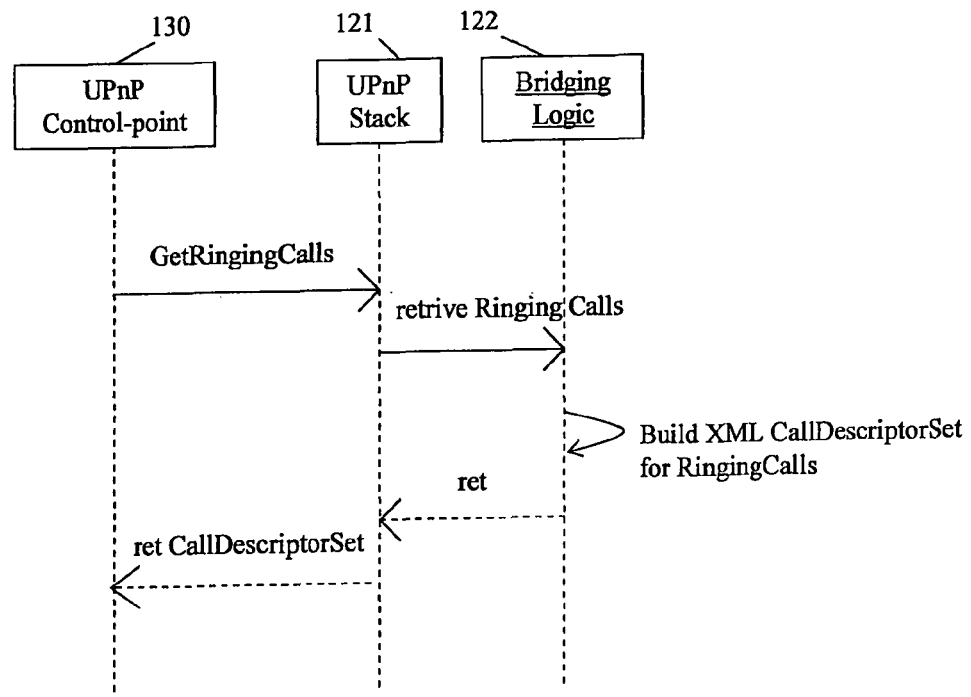
FIG. 11 shows an example of the principal messages exchanged when a consumer electronic appliance (UPnP control-point) requests detailed description of incoming calls.

Upon being notified on a change in the RingingCall state variable, UPnP control-point 130 can retrieve detailed description of the incoming call by invoking a GetRingingCalls operation supported by the interfacing device 120, as shown in FIG. 11.

At the receipt of the GetRingingCalls message from the UPnP control point 130, interfacing device 120 creates and returns a XML call descriptor list for all current ringing calls.

Based on the received information, UPnP control point 130 can decide whether to prompt the user about the incoming call, or ignore the call, or take some other course of action in accordance with some user-defined routing rules. For instance, the call can be accepted by invoking an AcceptCall operation, forwarded to another identity by invoking a ForwardCall operation, rejected by invoking a RejectCall operation, as shown in more detail below with reference to FIGS. 15, 16, 17, 18. In particular, the information that UPnP control-point 130 can use to determine its course of action may be any, or the combination of: the identity of the caller; the identity of the callee (e.g. whether the callee is the same identity registered by the control-point); the media capabilities (SDP) of the caller (e.g. whether the control-point's media capabilities match totally or in part the incoming SDP), etc.

Besides the RingingCall state variable, the interfacing device may support other state variables to notify actions performed by a WAN device at the other side of a communication session. For example, a CallTerminated state variable can be used to notify that a WAN device has terminated the communication session and a CallCancelled state variable can be used to notify that a pending incoming call has been cancelled by a WAN device.

Figure 12:
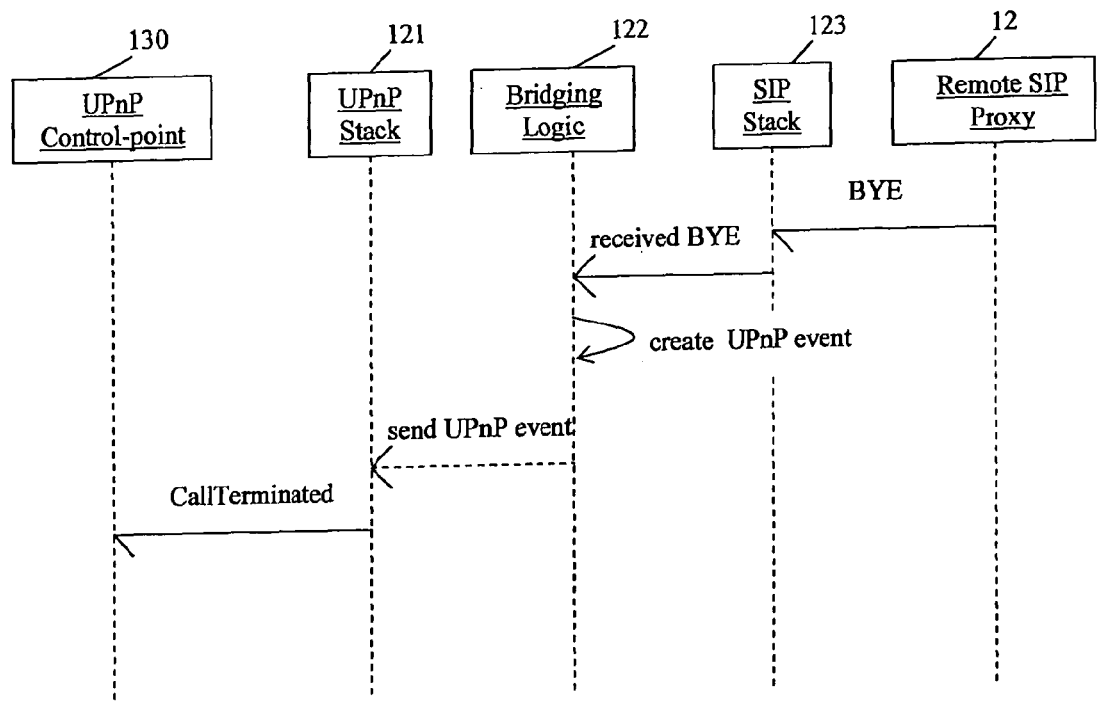
FIG. 12 shows an example of the principal messages exchanged when a consumer electronic appliance (UPnP control-point) is notified that a WAN user device terminated a call.

FIG. 12 shows an example of the principal messages exchanged when an appliance (UPnP control-point) 130 is notified of the disengagement of a WAN device involved in a communication session with UPnP control-point 130, through intermediation of WAN server 12.

As shown in FIG. 12, in this situation SIP stack 123 receives a SIP BYE message from server (remote SIP proxy) 12. The SIP stack 123 dispatches the SIP BYE message to the bridging logic 122 which creates a CallTerminated event message by setting the CallTerminated state variable with the call identifier (CallID) of the terminated call.

Changes in the state variable causes the UPnP stack 121 to broadcast the CallTerminated event message to all UPnP control points in the local network 100 that have subscribed on changes in the state variables of the interfacing device 120.

Upon being notified on a change in the CallTerminated variable, UPnP control-point 130 participating in the terminated call can take the appropriate course of action, e.g. by notifying the user and releasing the allocated media resources.

Figure 13:
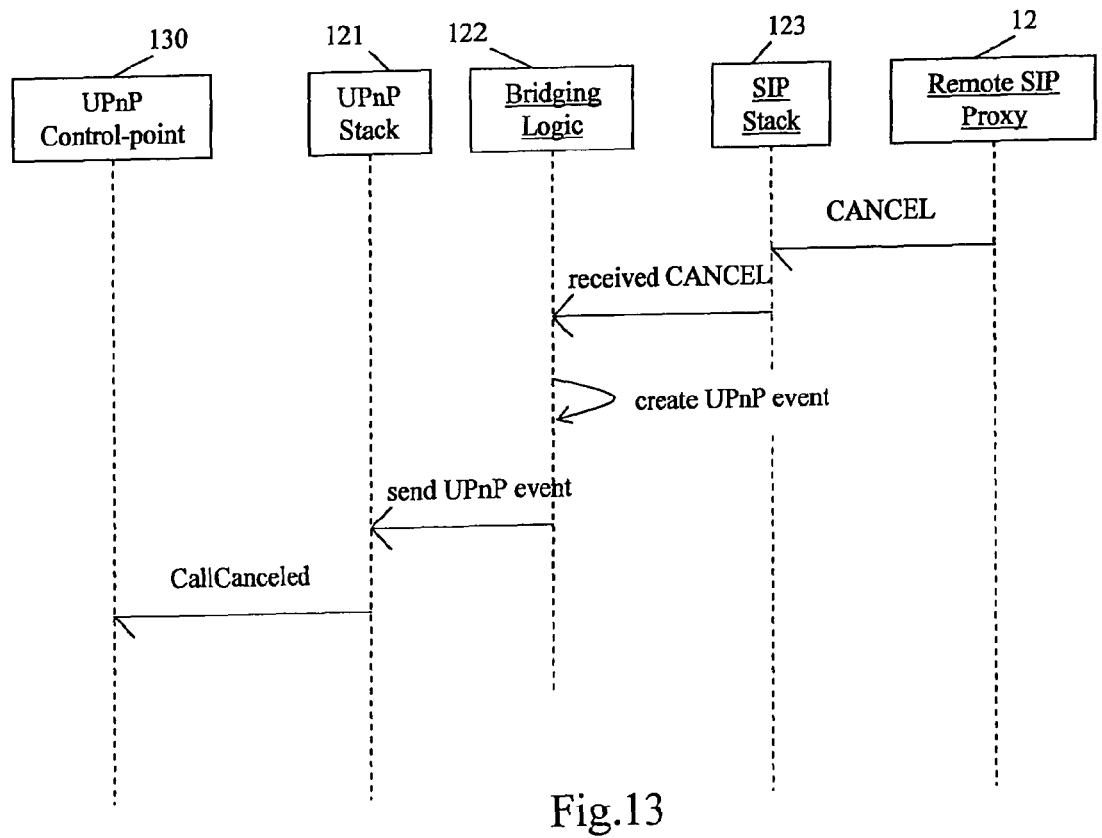
FIG. 13 shows an example of the principal messages exchanged when a consumer electronic appliance (UPnP control-point) is notified that a WAN user device aborted the setting up of a call.

FIG. 13 shows an example of the principal messages exchanged when an appliance (UPnP control-point) 130 is notified that a pending incoming call has been cancelled by a WAN device involved in a communication session with UPnP control-point 130, through intermediation of WAN server 12.

As shown in FIG. 13, in this situation SIP stack 123 receives a SIP CANCEL message from server (remote SIP proxy) 12. The SIP stack 123 dispatches the SIP CANCEL message to the bridging logic 122 which creates a CallCancelled event message by setting the CallCancelled state variable with the call identifier (CallID) of the cancelled call.

Changes in the state variable causes the UPnP stack 121 to broadcast the CallCancelled event message to all UPnP control points in the local network 100 that have subscribed on changes in the state variables of the interfacing device 120.

Upon being notified on a change in the CallCancelled variable, UPnP control-point 130 participating in the cancelled call can take the appropriate course of action, e.g. by notifying the user and releasing the allocated media resources.

Figure 14:
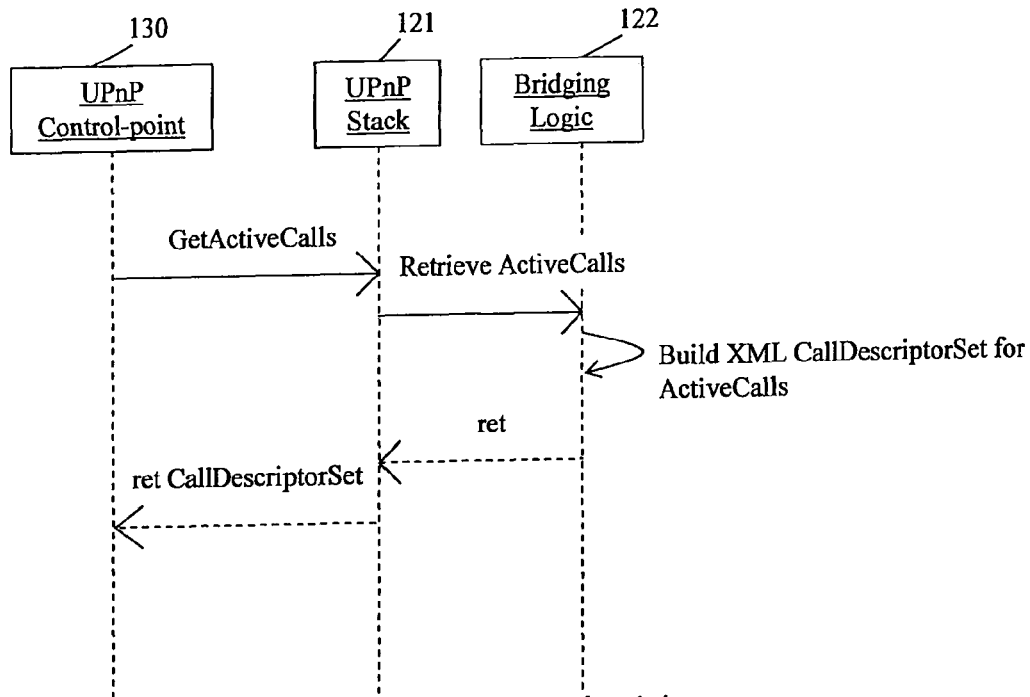
FIG. 14 shows an example of the principal messages exchanged when a consumer electronic appliance (UPnP control-point) requests detailed description of active calls.

FIG. 14 shows an example of the principal messages exchanged when an appliance (UPnP control-point) 130 invokes an operation (e.g., GetActiveCalls operation) supported by the interfacing device 120 to retrieve detailed information on the current active calls managed by interfacing device 120.

To this purpose, the interfacing device 120 maintains an internal call descriptor for each current active communication session. Upon receiving the GetActiveCalls message from the UPnP control point 130, the UPnP stack 121 dispatches it to the bridging logic 122 that creates an XML call descriptor for each active call, and whose elements comprise, in particular, the call identifier, the SIP identities of the involved parties, the media session descriptions (SDPs) submitted by the parties, and the call status. The created XML call descriptor is returned to the UPnP control point 130.

Figure 15:
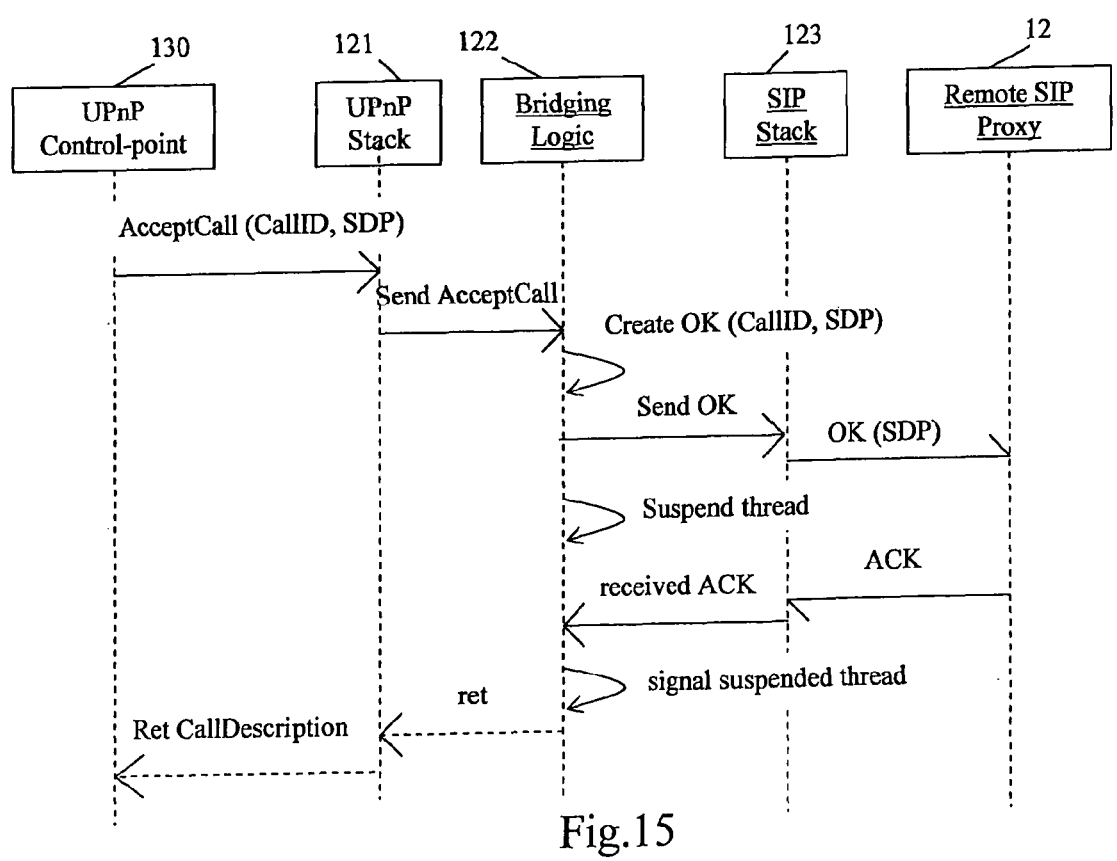
FIG. 15 shows a first example of the principal messages exchanged when a consumer electronic appliance (UPnP control-point) requests to accept an incoming call.
Figure 16:
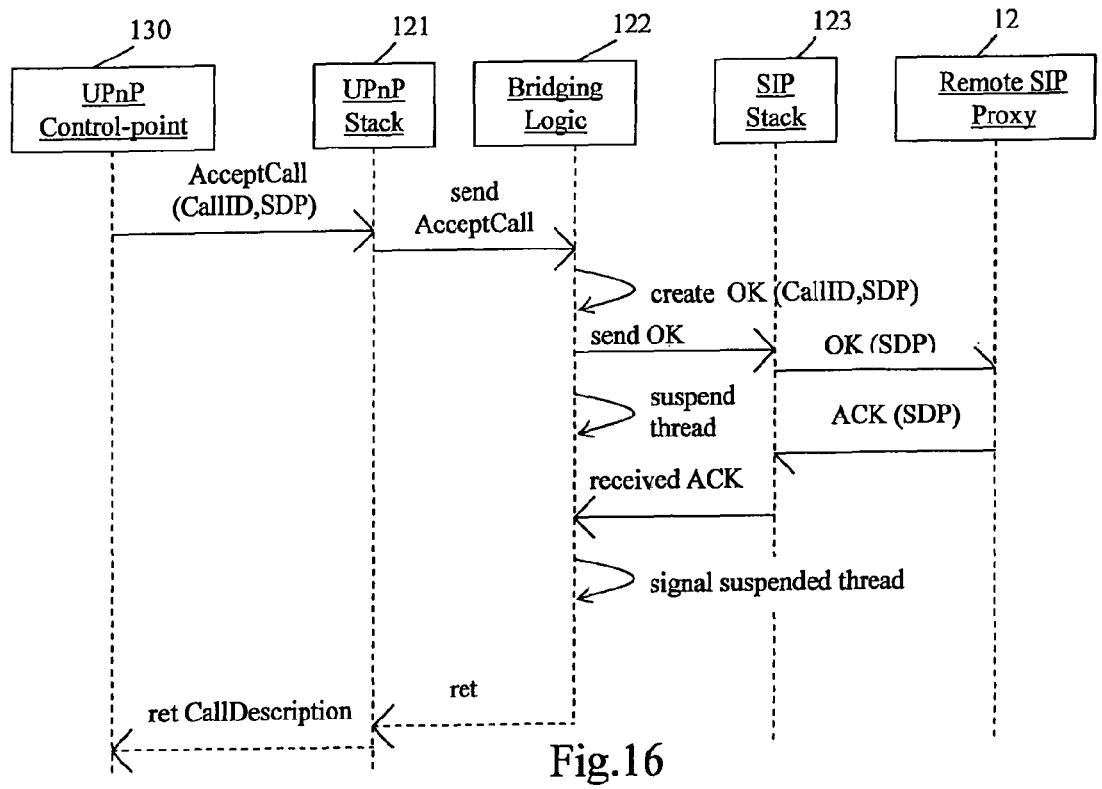
FIG. 16 shows a second example of the principal messages exchanged when a consumer electronic appliance (UPnP control-point) requests to accept an incoming call.

FIG. 15 shows an example of the principal messages exchanged when an appliance (UPnP control-point) 130 accepts a ringing call by invoking an operation (e.g. an AcceptCall operation) supported by the interfacing device 120.

As described in the foregoing, any incoming call causes the interfacing device 120 to set the RingingCall state variable with the CallID of the latest ringing call. Setting such state variable broadcasts a RingingCall event message to all subscribing UPnP control-points 130 in the local area network 100, in accordance to UPnP event model.

Upon receipt of said RingingCall message, a control-point can invoke GetRingingCalls operation to retrieve detailed description of the current ringing calls and may then decide to accept the call (e.g. after prompting the user) by invoking the AcceptCall operation of the interfacing device 120.

The AcceptCall message comprises the CallID of the ringing call and the session description protocol (SDP) carrying the negotiated media capabilities of the LAN appliance that will be used in the communication session.

The bridging logic 122 then creates a SIP OK message, whose body contains the SDP passed in the AcceptCall message, and sends such OK message to WAN server 12 through SIP stack 123. Then, the current thread of execution suspends on a condition variable, waiting to be, resumed upon reception of a SIP ACK message from the calling WAN device through WAN server 12.

A slightly different situation occurs when the ringing call does not contain the SDP of the calling WAN device, marking it as an 'offer' in SIP parlance. In this case, shown in FIG. 16, the AcceptCall message is invoked with a SDP comprising all supported media capabilities of the LAN appliance that will be used in the communication session. After sending the SIP OK message, the current thread of execution suspends on a condition variable, waiting to be resumed upon reception of a SIP ACK message from the calling WAN device through WAN server 12 which will contain the negotiated SDP.

In both cases, an XML call descriptor for the newly created communication session will be returned to the UPnP control point 130.

Figure 17:
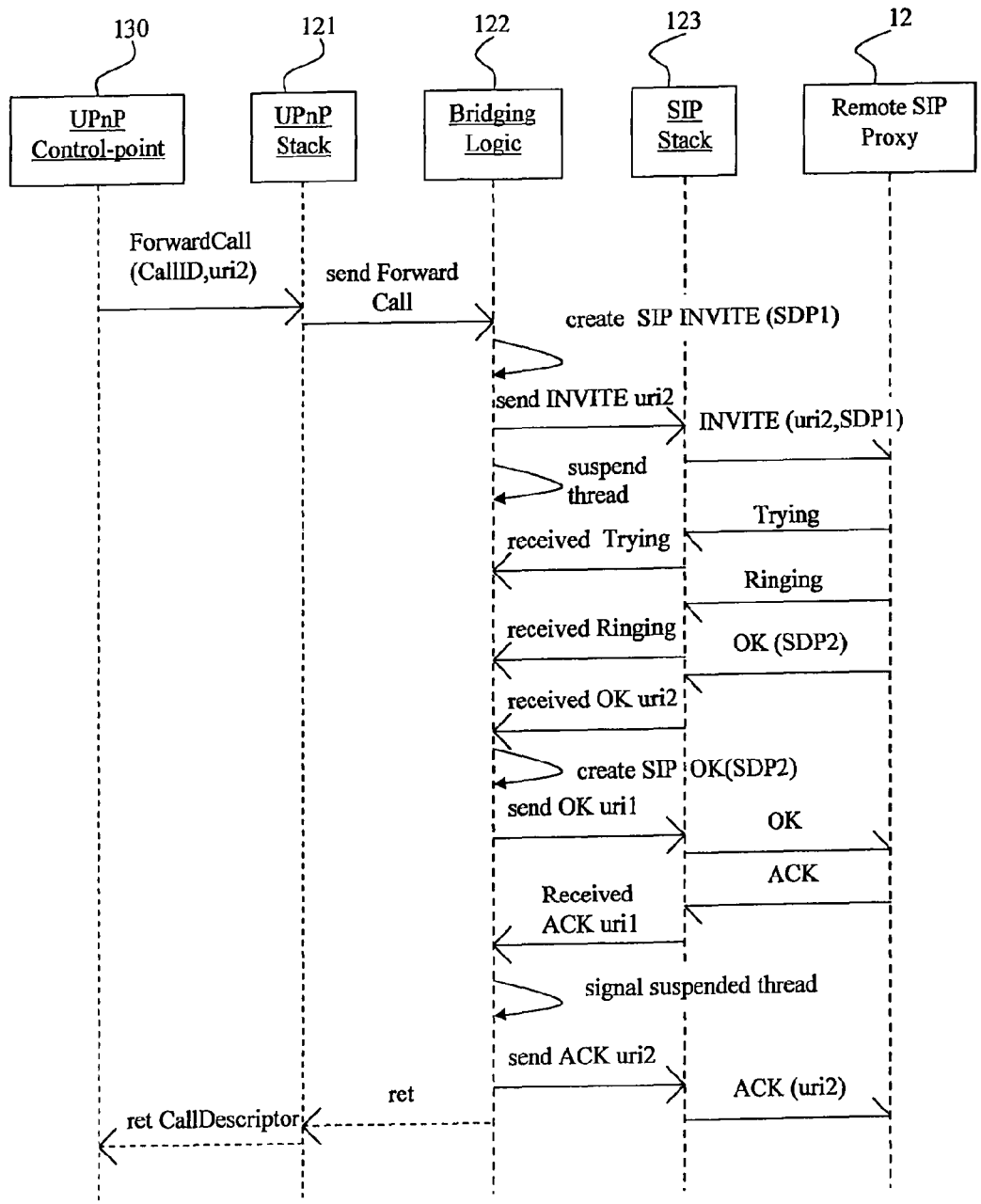
FIG. 17 shows an example of the principal messages exchanged when a consumer electronic appliance (UPnP control-point) requests to forward an incoming call.

FIG. 17 shows an example of the principal messages exchanged when an appliance (UPnP control-point) 130 wishes to forward an incoming (ringing) call to a WAN device (forwardee party) by invoking an operation (e.g. ForwardCall operation) of the interfacing device 120. The message comprises the CallID of the ringing call and the SIP URI (URI2) of the forwardee party.

The ForwardCall operation implements the behavior of a SIP back-to-back user agent (B2BUA). The interfacing device 120 sends a SIP INVITE message with the SDP of the incoming call (SDP1) to the forwardee party. Then the current thread of execution (e.g. T1) suspends on a condition variable, waiting to be resumed upon completion of the overall SIP transaction. When a response is received from the forwardee party (e.g. SIP OK message comprising the SDP2 negotiated by the forwardee party), the suspended thread resumes its processing in the same manner as described in the foregoing (not shown in FIG. 17, for the sake of simplicity).

Analogously, the same response is sent back to the calling WAN device while the forwardee party is acknowledged through a SIP ACK message.

Finally, the XML call descriptor of the new call is returned to the UPnP control-point 130.

The newly established communication session is actually a third-party-call involving two external parties, and it remains under the control of the UPnP control-point 130 that may subsequently, for example, terminate the call or transfer the call locally with either of the two parties.

According to an embodiment, the ForwardCall message may also provides a timeout parameter to specify the maximum time for the operation to complete.

Figure 18:
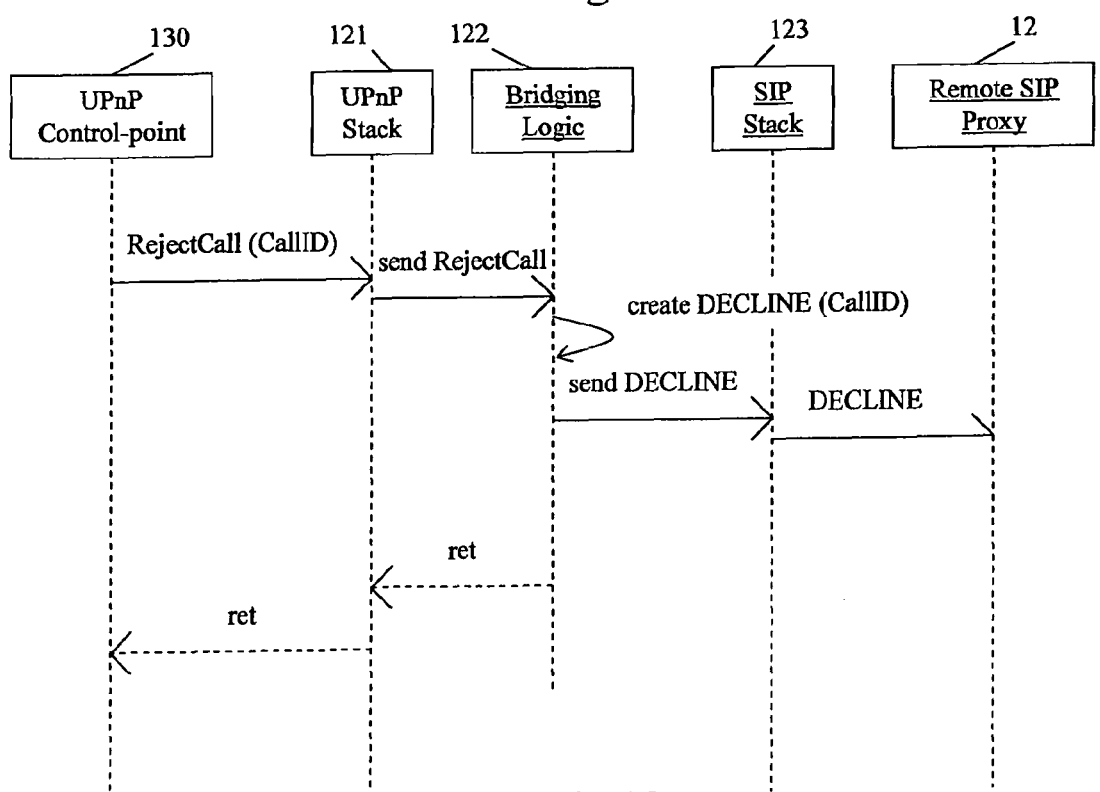
FIG. 18 shows an example of the principal messages exchanged when a consumer electronic appliance (UPnP control-point) requests to reject an incoming call.

FIG. 18 shows an example of the principal messages exchanged when an appliance (UPnP control-point) 130 wishes to reject an incoming (ringing) call by invoking an operation (e.g., RejectCall operation) supported by the interfacing device 120.

The bridging logic 122 creates a SIP DECLINE message and sends it to the calling WAN device through the intermediation of the server (remote SIP proxy) 12.

Figure 19:
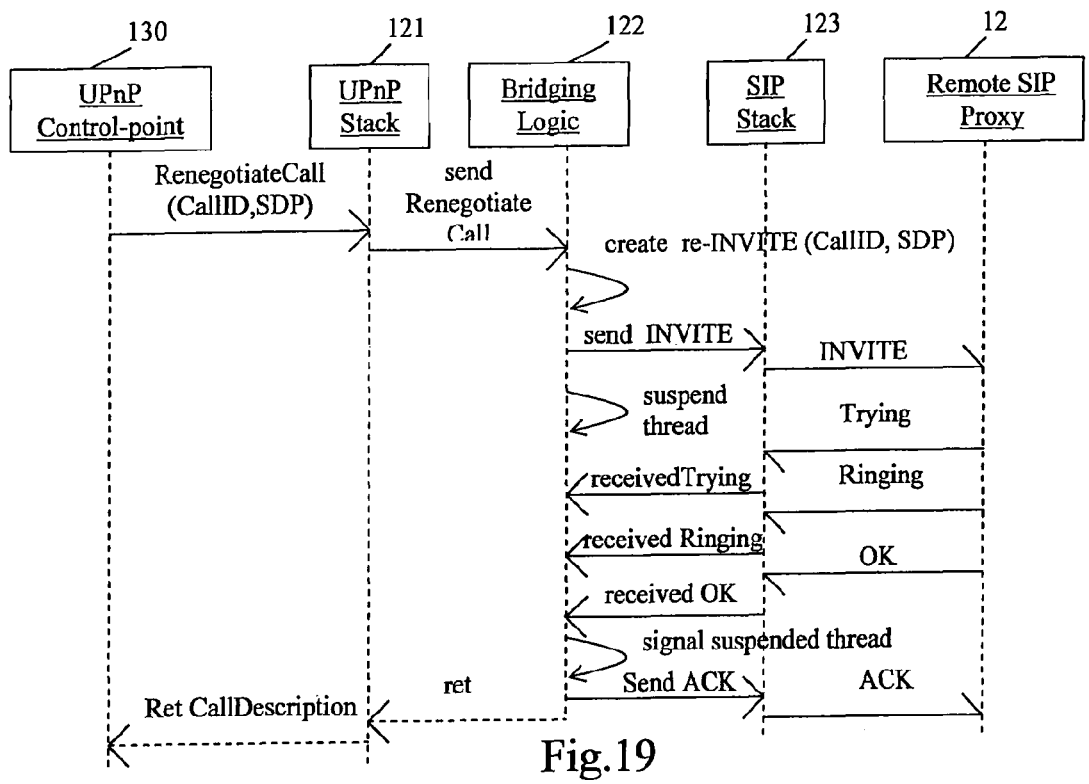
FIG. 19 shows an example of the principal messages exchanged when a consumer electronic appliance (UPnP control-point) requests to renegotiate the media capabilities of a previously set up call.

FIG. 19 shows an example of the principal messages exchanged when an appliance (UPnP control-point) 130 requests to renegotiate the media capabilities of an established call by invoking an operation (e.g. RenegotiateCall operation) supported by the interfacing device 120.

A typical scenario in which this operation is useful is when the user decides to transfer an ongoing call from an appliance 130 (e.g., a set-top-box in a living room) of the local area network 100 to another appliance 130 (e.g., a PC in a study) of the local area network 100. Indeed, transferring a communication session may require renegotiating the capabilities of the devices, the IP addresses and the ports. Call transfer can be dealt with by re-INVITE(ing) the other party (WAN device) involved in the ongoing call using the same CallID of the established call and supplying a new SDP with the media capabilities, IP addresses, and ports of the appliance the call is to be transferred.

The message flow depicted in FIG. 19 is similar to the one used for setting up a new call. Therefore, reference is made to what described above with reference to FIG. 3. According to an embodiment (not shown) of RenegotiateCall operation, the appliance 130 requesting the operation may also provide a timeout parameter to specify the maximum time for the operation to complete.

Figure 20:
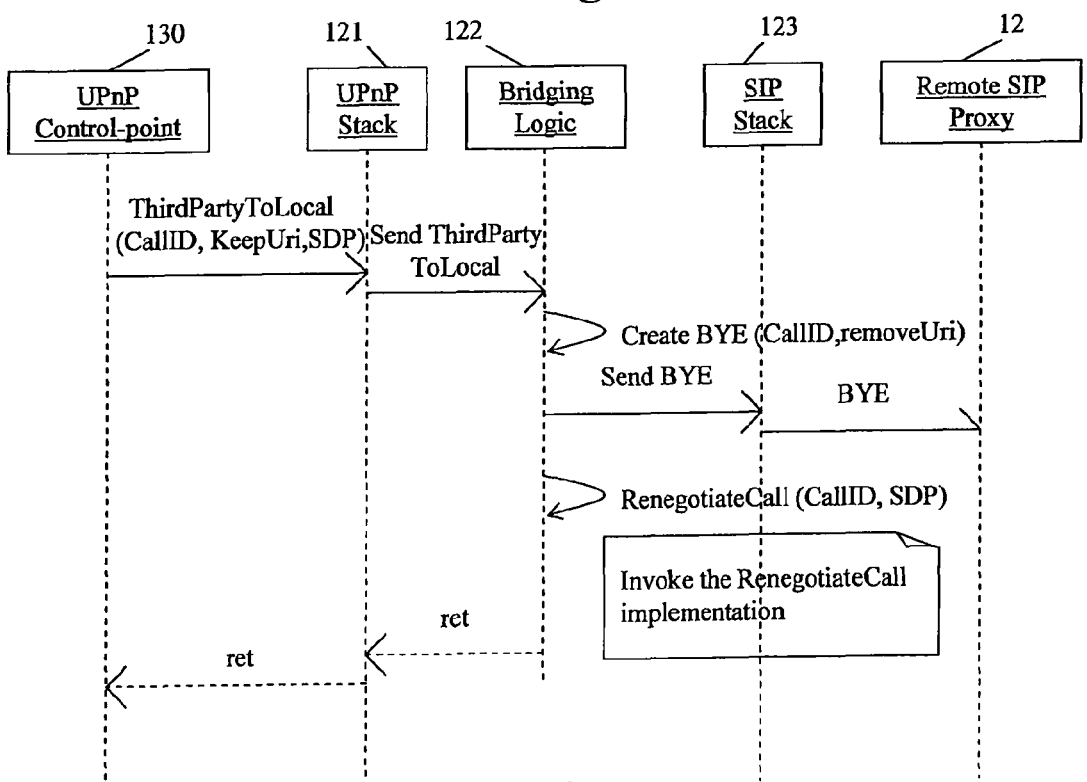
FIG. 20 shows an example of the principal messages exchanged when a consumer electronic appliance (UPnP control-point) requests to transfer an ongoing third-party-call to a local appliance.

FIG. 20 shows an example of the principal messages exchanged when an appliance (UPnP control-point) 130 requests to transfer an ongoing third-party-call to a LAN appliance 130 by invoking a ThirdPartyToLocal operation supported by the interfacing device 120.

As already disclosed above, a third-party-call established between two WAN devices 14 (not shown in FIG. 20) through the interfacing device 120, either by invoking a NewThirdPartyCall or a ForwardCall operation, is under control of the interfacing device 120, thus allowing a user in the local area network 100 to take further actions on the third-party-call. For example, an appliance (UPnP control-point) 130 in the local area network 100 can request to transfer a third-party-call to an appliance 130 in the local area network 100 by terminating the communication session with one party (one WAN device) and renegotiating the call with the other party (the second WAN device) by invoking the RenegotiateCall operation.

As shown in the message flow of FIG. 20, the ongoing session with the party to be removed is terminated by sending a SIP BYE message, while the ongoing session with the other party is renegotiated by invoking the RenegotiateCall operation specifying the media capabilities, addresses, and ports of the local media appliance 130, as described above with reference to FIG. 19.

According to an embodiment (not shown) of ThirdPartyToLocal operation, the appliance 130 requesting the operation may also provide a timeout parameter to specify the maximum time for the operation to complete.

Figure 21:
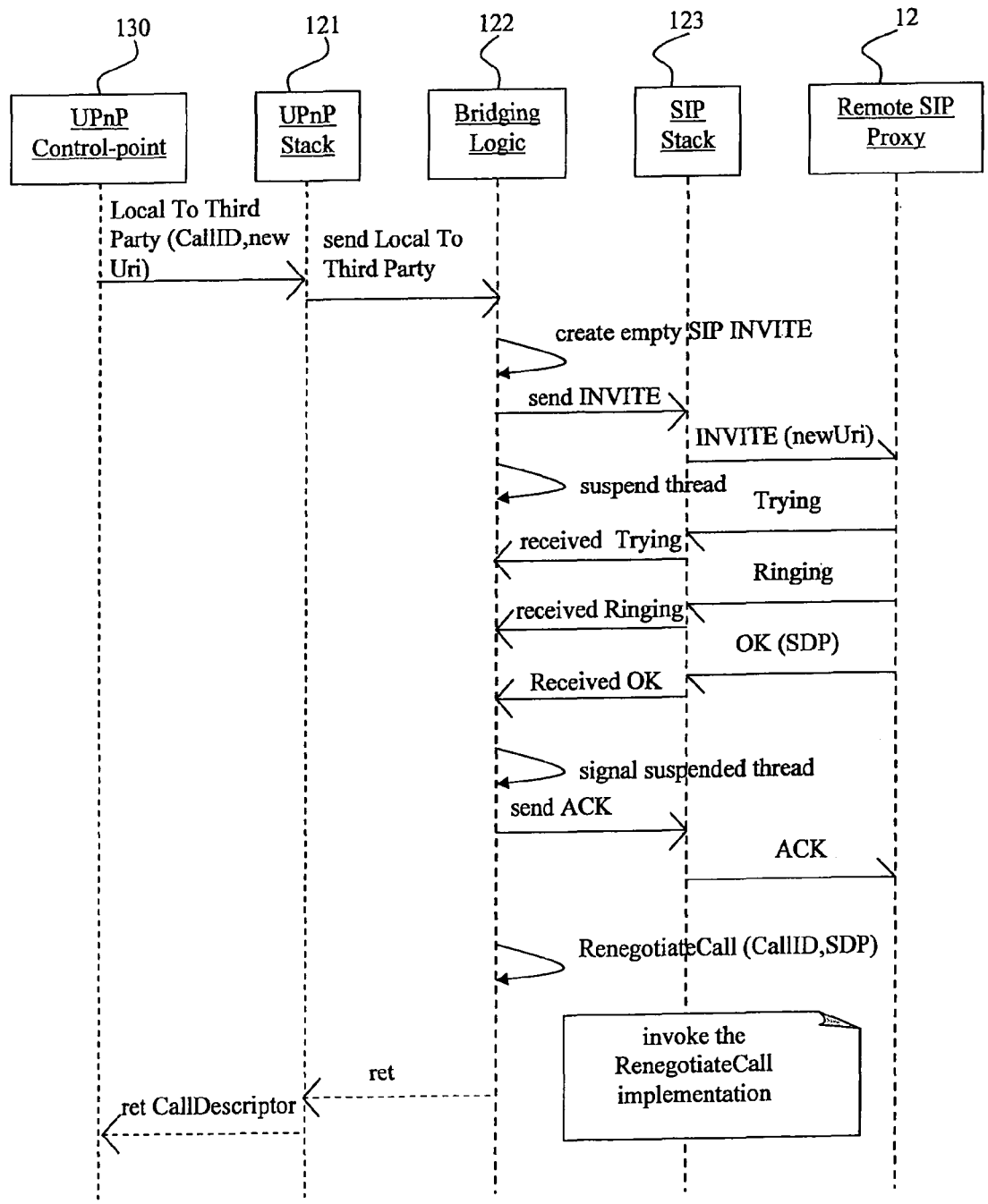
FIG. 21 shows an example of the principal messages exchanged when a consumer electronic appliance (UPnP control-point) requests to transfer an ongoing local call to a third-party-call.

FIG. 21 shows an example of the principal messages exchanged when an appliance (UPnP control-point) 130 requests to transfer an ongoing call established between a local appliance 130 and a WAN device 14 (not shown in FIG. 21) to a third-party-call by invoking an operation (e.g. LocalToThirdParty operation) supported by the interfacing device 120.

Complementing the ThirdPartyToLocal operation, the LocalToThirdParty operation allows a user to transfer a call involving a local appliance (UPnP control-point) 130 to a WAN device 14 thereby transforming the local call into a third-party-call. For example, this operation allows a user to transfer a call currently established with a local area network set-top-box to his/her mobile phone, which behaves as WAN device 14.

As shown in FIG. 21, the LocalToThirdParty operation is implemented by sending a SIP INVITE message to the new party with an empty SDP (thus making an offer) and using the received SDP in the SIP OK response to renegotiate the call with the other party currently in the call. In particular, the ongoing session with the other party is renegotiated by invoking the RenegotiateCall operation specifying the media capabilities, addresses, and ports of the new party the call is to be transferred, as described above with reference to FIG. 19.

According to an embodiment (not shown) of LocalToThirdParty operation, the appliance 130 requesting the operation may also provide a timeout parameter to specify the maximum time for the operation to complete.

Figure 22:
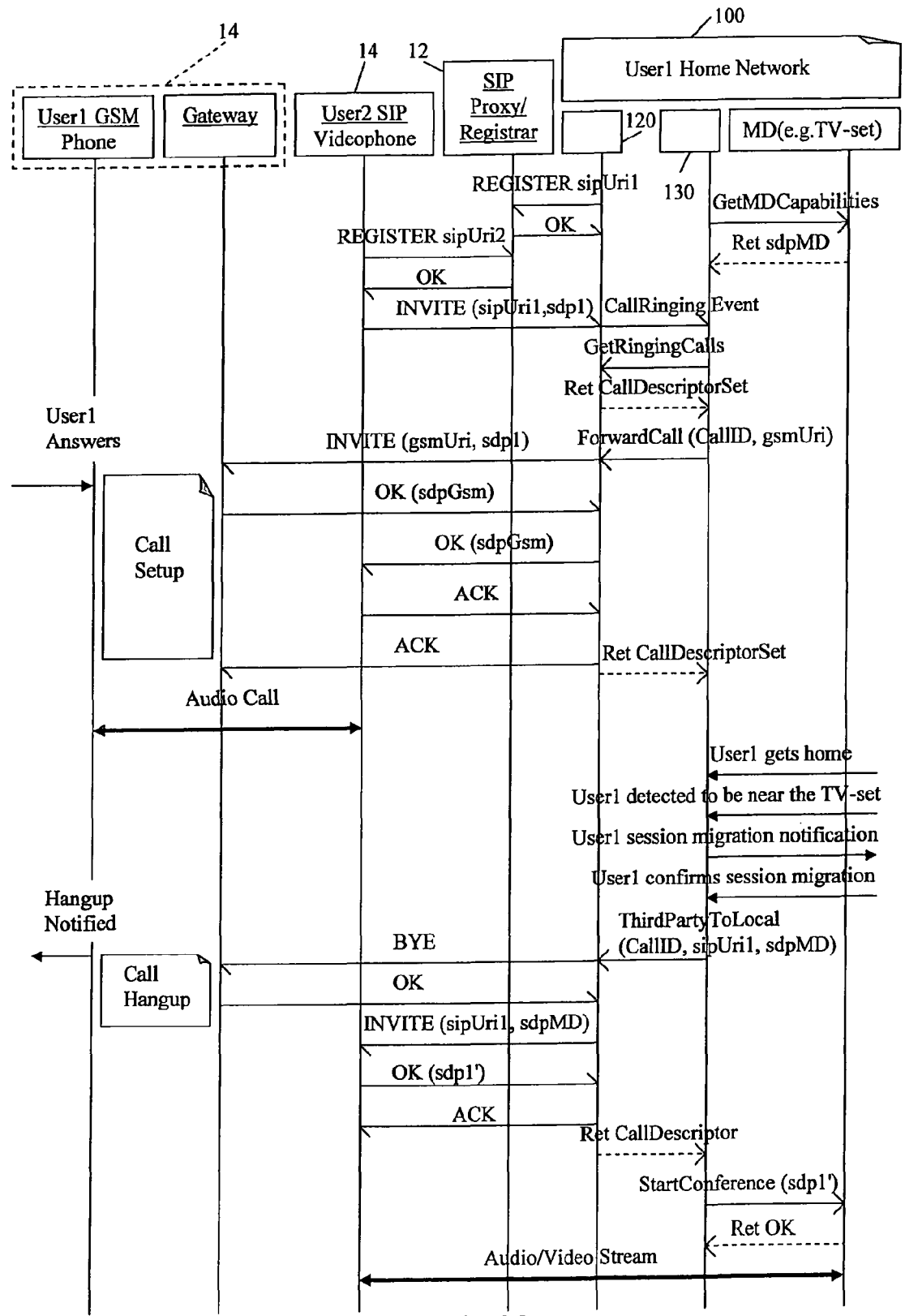
FIG. 22 shows an example of the principal messages exchanged in an exemplary application of the invention.

FIG. 22 show an example of the principal messages exchanged according to an exemplary scenario wherein the communication system according to the invention comprises a LAN (User1 home network) 100; a SIP Proxy/Registrar WAN server 12, a User1's WAN SIP device 14 (e.g., a User1 GSM phone associated with the SIP network through a gateway) and a User2's WAN SIP device 14 (e.g., a SIP videophone). Moreover, the LAN 100 comprises an interfacing device 120 according to the invention, a user appliance (UPnP control-point) 130 with enhanced capabilities to detect whether a user is in the LAN 100 (e.g., by exploiting indoor location technologies known in the art), and to appropriately manage incoming call routing and session transfer; and a media device (MD) as, for example, a TV-set.

Appliance 130, User2's WAN SIP device 14 and User1's WAN SIP device 14 are associated with SIP-URI identifiers URI1, URI2 and gsmURI, respectively.

In the example of FIG. 22, appliance 130 and User2's WAN SIP device 14 register their SIP identities with the SIP Proxy/Registrar WAN server 12 in the WAN network.

Through the UPnP discovery protocol, appliance 130 discovers in LAN 100 all available media devices and their media capabilities, for instance by invoking an operation (GetMDCapabilities) that returns the SDP media descriptor (sdpMD) of the media devices, which can subsequently be used in session negotiation and setup.

For an incoming call from User2's WAN SIP device 14 to appliance 130, the latter forwards the incoming call to User1's WAN SIP device 14 (e.g. in accordance with some routing rules specified by User1) by invoking a ForwardCall operation. User1 receives and accepts the incoming call at his/her WAN SIP device 14 and an audio-only session is negotiated between User2's video-phone 14 and User1's mobile-phone 14 (e.g. due to the limited capabilities of User1's device).

During the call User1 enters his/her home and the appliance 130 detects (e.g. through a proximity sensor) that (s)he is within range for the fruition of the local TV-set, and thus notifies User1 that a session transfer can be activated for the current call. User1 accepts to transfer the current call from mobile-phone 14 to the local TV-set (e.g. through voice commands elaborated by the TV-set and notified to appliance 130). Session migration is thus performed by the appliance 130 by invoking a ThirdPartyToLocal operation supported by interfacing device 120, as described with reference to FIG. 20, and a StartConference operation supported by the TV-set, which actually starts the audio/video streams transmission and reception, using the SDP descriptor negotiated by the interfacing device 120.

In view of the above description, it is noted that according to the invention, the interfacing device 120 supports a set of high-level operations that allow call conference setup or management. Said interfacing device acts as SIP Multi User Agent (MUA) by implementing the high-level operations invoked by a UPnP control-point through a series of SIP transactions and low-level messages. Each high-level operation corresponds to a well-defined semantic functionality as perceived relevant in the definition of the service. For example, as shown above, NewCall is a typical operation supported by the interfacing device 120 to setup a new two-party call. The control-point that invokes the NewCall operation is not involved in the details of its underlying implementation and therefore in the complex SIP transactions that take place during a session setup operation. All the control-point is informed about is the outcome of the overall SIP transactions underlying the invoked operation.

The invention claimed is:

1. A method performed by a device in a local area network for enabling a local area network appliance, supporting a synchronous-invocation/broadcast-notification protocol adapted to perform a synchronous invocation of operations and a broadcast notification of events, to control communication sessions in a wide area network, said wide area network supporting a session-control protocol, comprising:
   a) receiving from the local area network appliance a synchronous-invocation/broadcast-notification-protocol message invoking an operation for controlling a communication session in the wide area network, the execution of said operation comprising an exchange of at least two session-control-protocol messages with at least one wide area network apparatus supporting said session-control-protocol;
   b) processing the received synchronous-invocation/broadcast-notification-protocol message to generate a first of said at least two session-control-protocol messages;
   c) sending the first of said at least two session-control-protocol messages toward said wide area network to start the execution of said operation;
   d) delaying generation of a synchronous-invocation/broadcast-notification-protocol response for the local area network appliance to the invoked operation until said exchange of said at least two session-control protocol messages is terminated;
   e) exchanging the rest of said at least two session-control-protocol messages with at least one wide area network apparatus;
   f) when said exchange of said at least two session-control-protocol messages is terminated, generating the synchronous-invocation/broadcast-notification-protocol response for the local area network appliance, the generated response being indicative of an outcome of the operation; and
   g) sending the generated response to the local area network appliance.

2. The method according to claim 1, wherein the sending the first of said at least two session-control-protocol messages to said at least one wide area network apparatus occurs through a wide area network server.

3. The method according to claim 1, wherein, when the outcome of the operation is positive, the generated response comprises information required to correctly control the predetermined communication session.

4. The method according to claim 1, further comprising receiving from the local area network appliance a request to set up a subscription to receive notifications on changes in at least one predetermined state variable.

5. The method according to claim 4, further comprising, at the occurrence of a change in said at least one predetermined state variable, broadcasting a notification of said change to the subscribed local area network appliance.

6. The method according to claim 1, wherein said synchronous-invocation/broadcast-notification protocol is universal plug and play.

7. The method according to claim 1, wherein said session-control protocol is session initiation protocol.

8. The method according to claim 1, wherein the operation invoked in receiving a synchronous-invocation/broadcast-notification-protocol message is selected from the group of: an operation for registering a local area network appliance identity before the at least one wide area network apparatus; an operation for setting up a communication session between the local area network appliance and a wide area network user device; an operation for setting up a communication session between two wide area network user devices; an operation for accepting to set up a communication session with a wide area network user device; an operation for transferring an ongoing communication session between the local area network appliance and a wide area network user device from the local area network appliance toward another wide area network user device; an operation for transferring an ongoing communication session between a first wide area network user device and a second wide area network user device from the first wide area network user device to the local area network appliance; an operation for forwarding an incoming call to the local area network appliance toward a user device; and an operation for renegotiating the media capabilities involved in a pending communication session.

9. The method according to claim 1, wherein when said session-control protocol is session initiation protocol, the message generated in processing the synchronous-invocation/broadcast-notification-protocol message is selected from the group of a session initiation protocol register message, a session initiation protocol invite message and a session initiation protocol 200 OK message.

10. The method according to claim 1, further comprising charging a thread of execution with the execution of the invoked operation, said thread executing the processing of the received synchronous-invocation/broadcast-notification-protocol message to generate the first of said at least two session-control-protocol messages and the sending said message towards said wide area network to start the execution of said operation.

11. The method according to claim 10, wherein the exchanging the rest of said at least two session-control protocol messages with said at least one of the plurality of wide area network apparatuses comprises suspending execution of said thread and resuming it when the exchange of said at least two session-control-protocol messages is terminated.

12. The method according to claim 11, wherein the generating the response for the local area network appliance and the sending the generated response to the local area network appliance are carried out by the resumed thread of execution.

13. An interfacing device within a local area network containing a processor and memory for enabling a local area network appliance supporting a synchronous-invocation/broadcast-notification protocol adapted to perform a synchronous invocation of operations and a broadcast notification of events, to control communication sessions in a wide area network, the wide area network supporting a session-control protocol, the interfacing device being adapted to:
  a) receive from the local area network appliance a synchronous-invocation/broadcast-notification-protocol message invoking an operation for controlling a communication session in the wide area network, the execution of said operation comprising an exchange of at least two session-control-protocol messages with at least one wide area network apparatus supporting said session-control-protocol;
  b) process the received synchronous-invocation/broadcast-notification-protocol message to generate a first of said at least two session-control-protocol messages;
  c) send the first of said at least two session-control-protocol messages toward the wide area network to start the execution of said operation;
  d) delay generation of a synchronous-invocation/broadcast-notification-protocol response for the local area network appliance to the invoked operation until said exchange of said at least two session-control protocol messages is terminated;
  e) exchange the rest of said at least two session-control-protocol messages with at least one wide area network apparatus;
  f) when said exchange of said at least two session-control-protocol messages is terminated, generating the synchronous-invocation/broadcast-notification-protocol response for the local area network appliance, the generated response being indicative of an outcome of the operation; and
  g) sending the generated response to the local area network appliance.

14. A communication system comprising:
  a local area network appliance supporting a synchronous-invocation/broadcast-notification protocol adapted to perform a synchronous invocation of operations and a broadcast notification of events;
  an interfacing device in a local area network; and
  a wide area network comprising a plurality of wide area network apparatuses supporting a session-control protocol,
  wherein the interfacing device comprises modules capable of being adapted to:
    a) receive from the local area network appliance a synchronous-invocation/broadcast-notification-protocol message invoking an operation for controlling a communication session in the wide area network, the execution of said operation comprising an exchange of at least two session-control-protocol messages with at least one of said plurality of wide area network apparatuses;
    b) process the received synchronous-invocation/broadcast-notification-protocol message to generate a first of said at least two session-control-protocol messages;
    c) send the first of said at least two session-control-protocol messages toward one of said plurality of wide area network apparatuses;
    d) delay generation of a synchronous-invocation/broadcast-notification-protocol response for the local area network appliance to the invoked operation until said exchange of said at least two session-control protocol messages is terminated;
    e) exchange the rest of said at least two session-control protocol messages with said at least one of the plurality of wide area network apparatuses;
    f) when said exchange of said at least two session-control-protocol messages is terminated, generating the synchronous-invocation/broadcast-notification-protocol response for the local area network appliance, the generated response being indicative of an outcome of the operation; and
    g) sending the generated response to the local area network appliance.

* * * * *